(12) United States Patent
Trau et al.

(10) Patent No.: US 7,754,646 B2
(45) Date of Patent: Jul. 13, 2010

(54) SYNTHESIS AND USE OF ORGANOSILICA PARTICLES

(75) Inventors: Mathias Trau, Balmoral (AU); Angus Johnston, Brisbane (AU)

(73) Assignee: Nanomics Biosystems Pty Ltd (AU)

( * ) Notice: Subject to any disclaimer, the term of this patent is extended or adjusted under 35 U.S.C. 154(b) by 0 days.

(21) Appl. No.: 10/186,783

(22) Filed: Jul. 1, 2002

(65) Prior Publication Data
US 2003/0124564 A1   Jul. 3, 2003

Related U.S. Application Data

(60) Provisional application No. 60/301,415, filed on Jun. 29, 2001.

(51) Int. Cl.
*B01J 21/06*   (2006.01)
(52) U.S. Cl. .......................... 502/233; 506/30; 506/43; 536/25.3; 428/405
(58) Field of Classification Search ............... None
See application file for complete search history.

(56) References Cited

U.S. PATENT DOCUMENTS

| | | | | | |
|---|---|---|---|---|---|
| 2,885,366 | A | * | 5/1959 | Iler | 516/90 |
| 3,855,172 | A | * | 12/1974 | Iler et al. | 523/223 |
| 5,786,219 | A | * | 7/1998 | Zhang et al. | 436/523 |
| 2003/0228619 | A1 | * | 12/2003 | Needels | 435/6 |

FOREIGN PATENT DOCUMENTS

WO   WO 99/24458   *   5/1999

OTHER PUBLICATIONS

Bruchez et al., "Semiconductor Nanocrystals as Fluorescent Biological labels", Science, Sep. 25, 1998, 281(5385):2013-2016.*
van Blaaderen et al., "Synthesis and Characterization of Colloidal Dispersions of Fluorescent, Monodisperse Silica Spheres", Langmuir, 1992, 8(12):2921-2931.*
Verhaegh et al., "Dispersions of Rhodamine-Labeled Silica Spheres: Synthesis, Characterization, and Fluorescence Confocal Scanning Laser Microscopy", Langmuir, 1994, 10(5):1427-1438.*

(Continued)

*Primary Examiner*—Christopher Low
*Assistant Examiner*—Christopher Gross
(74) *Attorney, Agent, or Firm*—Casimir Jones, S.C.

(57) ABSTRACT

Highly functionalized, porous organosilica particles and methods of their synthesis are described that employ high amounts of functional silane such as 3-mercaptopropyl trimethoxysilane. Silane particle diameters are controlled from less than 1 μm to over 100 μm. The particles have a high surface area due to their advantageous internal structures, which consist of large pores, typically up to 10 μm that are linked by small channels of typically about 20 nm diameter. Isothiocyanate modified fluorescent dyes can enter and react with thiol groups inside the pores. The invention also provides clear silica shells of controlled thicknesses to protect fluorescent signals and provide an independent parameter for distinguishing particle types based on light scattering off different sized particles. The particles are stable and useful for many purposes, particularly for optical bar coding in combinatorial synthesis of polymers such as nucleic acid, polypeptide, and other synthesized molecules.

22 Claims, 20 Drawing Sheets

OTHER PUBLICATIONS

Fowler et al., "Covalent coupling of an organic chromophore into functionalized MCM-41 mesophases by template-directed co-condensation", 1998, Chem. Commun., 17, pp. 1825-1826.*

Asefa et al., "Periodic mesoporous organosilicas with organic groups inside the channel walls", 1999, Nature, 402(6764), pp. 867-871.*

Antonietti et al., "Synthesis of Mesoporous Silica with Large Pores and Bimodal Pore Size Distribution by Templating of Polymer Latices", 1998, Advanced Materials, 10(2), pp. 154-159.*

Fowler et al., "Synthesis and characterization of ordered organo-silica-surfactant mesophases with functionalized MCM-41-type architecture", 1997, Chem. Commun., 18, pp. 1769-1770.*

Melde et al. 1999 Chem. Mater. 11:3302-3308.*

Egner et al. 1997 Chem Commun 735-736.*

Gait et al 1982 Nucleic Acids Research 10:6243-6254.*

Caruthers et al (1987 Meth. Enzymology 154:287-313).*

Cedric Boissiere et al., "A double step synthesis of mesoporous micrometric spherical MSU-X silica particles", Chem. Commun., 1999, pp. 2047-2048.

C.J. Brinker et al., "Sol-gel transition in simple silicates", Journal of Non-Crystalline Solids, 1982, pp. 47-64. vol. 48, Issue 1, Abstract Only.

G.H. Bogush et al., "Preparation of monodisperse silica particles: Control of size and mass fraction", Journal of Non-Crystalline Solids, 1998, pp. 95-106, vol. 104, Issue 1, Abstract Only.

A. Imhof et al., "Spectroscopy of Fluorescein (FITC) Dyed Colloidal Silica Spheres", J. Phys. Chem. B, 1999, pp. 1408-1415, vol. 103.

B. Karmakar et al., "Silica microspheres from the system tetraethyl orthosilicate-acetic acid-water", Journal of Non-Crystalline Solids, 1991, pp. 29-36, vol. 135, Issue 1, Abstract Only.

Toshiyasu Kawaguchi et al., "Spherical silica ges precipitated from acid catalyzed TEOS solutions", Journal of Non-Crystalline Solids, 1990, pp. 383-388, vol. 121, Issues 1-3, Abstract Only.

Ivana Soten et al., "New directions in self-assembly: materials synthesis over 'all' length scales", Current Opinion in Colloid & Interface Science, 1999, pp. 325-337, vol. 4, Issue 5, Abstract Only.

Hong Yang et al., "Synthesis mesoporous silica spheres under quiescent aqueous acidic conditions", Journal of Materials Chemistry, 1998, pp. 743-750, vol. 8, No. 3.

* cited by examiner

Tetraethyl orthosilicate
TEOS

R = H, CH$_2$CH$_3$, Si(OR)$_3$

SYNTHESIS AND USE OF ORGANOSILICA PARTICLES

CROSS-REFERENCE TO RELATED APPLICATIONS

This application claim benefit of U.S. Provisional Application No. 60/301,415, filed Jun. 29, 2001, hereby incorporated by reference.

BACKGROUND OF THE INVENTION

The invention relates generally to the synthesis and use of colloidal organosilica particles, and, more particularly, to compositions and methods for synthesis of controlled size silica that allow binding of activated molecules for diagnostics and other uses.

Rapid genetic sequencing holds the key to understanding the fundamental processes which govern cellular and molecular biology. Gene discovery has been the driving force of biotechnology over the past decade, but to obtain a better understanding of how genes are regulated and expressed in different individuals, the genetic sequence is simply not enough. It is necessary to be able to identify changes in single base pairs (Single Nucleotide Polymorphism—SNP) within a gene to understand why and how genes are expressed differently in different individuals. DNA sequencing of this magnitude can only be contemplated when sequencing techniques have been made considerably more cost-effective and robust than they are today, or will be in the foreseeable future.

The ability to perform DNA sequencing with an extremely large number of probes (e.g., $10^{10}$) on an inexpensive and well-defined high throughput platform is highly desirable and would overcome major deficiencies in current technology. The existing techniques used for sequencing genetic information (e.g., DNA microarray devices) are limited by speed, cost, and library size. Colloid-based libraries, however, are emerging as an extremely attractive alternative because they use significantly smaller probe sites (colloidal particles rather than spatially resolved sites on a microarray) and a 3-dimensional configuration. Instead of preparing oligonucleotide probes in pixels on a microarray, the probes can be either attached to (or synthesized on) polymer or ceramic particles 2 to 300 µm in diameter. Some of the most impressive advantages of colloids are that they are inexpensive to produce in enormous numbers and they can be conveniently stored in small volumes of fluid. Another important advantage, which has not been fully utilized to date, is the ability to generate enormous random libraries of probes via combinatorial split-and-mix processes (FIG. 1). The colloids required for this purpose should be encoded to permit each probe to be distinguished. The strategy requires colloidal supports which have unique and reproducible optical signatures (i.e., fluorescence and light scattering attributes) as detected, e.g., by a high performance flow cytometer.

Microparticles

Microparticles, having diameters measured in microns, are important in the biotechnology industry, and have assumed a special role as supports for synthesis of polymers such as oligonucleotides. Useful particles have been formed from organic polymers, such as polystyrene cross-linked with divinylbenzene, and have found use in combinatorial chemistry, which will play a growing role in developing new drugs and diagnostics. Such particles often swell in solvents. This swelling is another variable to consider when using the particles in solvents during reactions such as coupling reactions that occur on particles used in nucleic acid synthesis.

Typically, in combinatorial synthesis, particle swelling desirably increases particle surface area. However, when used for colloidal sequencing reactions the particle's optical properties are important for indicating the sequence of the polymer, such as an oligonucleotide, coupled to the surface. Particle swelling thus alters the optical properties and may jeopardize the encoded information. Another problem, particularly seen with commercially available polystyrene particles, is that dyes incorporated into the particles leach out when the particles are exposed to certain solvents.

Silica spherical particles are an improvement to this technology in some aspects. Silicon based particles resist swelling in solvents and generally display more consistent optical properties during their use in chemical procedures such as polymer synthesis. Unfortunately, commercially available silica particles typically are limited to less than 5 microns diameter size. Such sizes are too small for many flow cytometer applications and for use in machinery such as a conventional DNA synthesizer.

The Stober Process

A common method for synthesizing colloidal silica is the Stober process, which is a specific application of sol-gel synthesis as described by Stober et al. *J. Colloid Interface Sci.* 26, 62 (1968) and diagrammed in FIG. 2. The first step in the Stober process as shown in this figure is the hydrolysis of tetraethyl orthosilicate (TEOS) in a solution of ethanol, water, and ammonia as described by Brinker et al., *J. Non-Cryst. Solids* 48, 47-64 (1982). In this step, ammonia catalyzes the hydrolysis of TEOS (I) to form reactive silanol groups and hydroxyl (II). In a second base catalyzed reaction, the silanol groups (III, IV) condense to form a polymer chain (V).

As the polymer chain increases in length from the two reaction steps, the polymer solubility decreases until the chain no longer dissolves in the solution as described by Bogush et al. *J. Colloid Interface Sci.* 142, 1-18 (1991). The polymer precipitates out of solution as nano-sized silica particles, which are colloidally unstable. Consequently, the particles aggregate to form larger particles, as described by Bogush et al., *J. Colloid Interface Sci.* 142, 19-34 (1991). The particles formed from this process are monodisperse because the aggregation rate between a large aggregated particle and a nano-sized particle is much greater than the aggregation rate between two large aggregates or two nano-sized particles. This relationship is explained by Bogush et al., *J. Non-Cryst. Solids* 104, 95-106 (1988).

The Stober process outlined above advantageously allows incorporation of fluorescent dyes into the silica network. This incorporation may occur via use of silane coupling agents, such as 3-aminopropyl trimethoxysilane (APS), which react with isothiocyanate modified dyes to form fluorescent silane monomers as shown in FIG. 3. See for example van Blaaderen et al. *Langmuir* 8, 2921-2931 (1992). The methoxy groups hydrolyze to form silanol groups. The silanols subsequently condense with TEOS (see FIG. 2) and are incorporated into the polymer chains.

Unfortunately, particles formed via the Stober process generally are limited to a maximum size of approximately 3 microns, which is insufficient for many purposes. Particle sizes desirably should be controlled over a larger diameter range. Further, the particles generally have limited porosities yet many procedures require use of or could benefit from large porosity particles. Such an improvement in particles and methods for their synthesis would allow greater commercial use of desirable silicon-based particles.

Acid Catalyzed Processes

Acid catalyzed hydrolysis of TEOS provides an alternative mechanism for forming colloidal silica as described by many workers (Kawaguchi and Ono *J. Non-Cryst. Solids* 121, 383-388 (1990); Karmakar et al. *J. Non-Cryst. Solids* 135, 29-36 (1991); Ding and Day *J. Mater. Res.* 6, 168-174 (1991); Mon et al. *J. Cer. Soc. Jap.* 101,1149-1151(1993); Ono and Takahashi *World Congress on Particle Technology* 3, 20 1-11; Pope *Mater. Res. Soc. Symp. Proc.* 372, 253-262 (1995) and Pope, *SPIE,* 1758, 360-371 (1992). Many methods have been employed using acid hydrolysis to form silica films (Aksay et al., *Science* 273, 892-898 (1996)) and non-spherical particles (Soten and Ozin *Curr. Opin. Colloid Interface Sci.* 4, 325-337 (1999)), but the method of acid synthesis formation of spherical particles is less well developed.

More recent reports of acid catalyzed particle formation show the formation of uniform pure silica spheres of up to approximately 10 microns. See Yang et al., *Journal of Materials Chemistry* 8, 743-750 (1998); Qi et al., *Chem. Mater.* 10, 1623-1626 (1998); and Boissiere and Lee *Chemical Communications* 2047-2048 (1999). However, these spherical particles generally require covalent linking of dye into the silica network for practical applications. For this reason silane coupling agents such as APS and 3-mercaptopropyl trimethoxysilane (MPS) often are chosen for incorporation into the particles. Yet another problem generally with these particles is the limitation of the number of binding sites on their surfaces and limited porosity, which often dominate the usefulness of the particles. Thus, any method that can increase the number of binding sites and/or porosity would be beneficial in a number of fields of use.

One particularly important field of use that would benefit greatly from use of particles having a high binding site density is colloidal sequencing. Colloidal sequencing uses particles as supports to build molecules formed by diverse sequential reactions, and requires a method (typically optical) for labeling the different species formed. Unfortunately, such particles are not easily optically distinguishable from each other. Most commercially available particles contain only up to 3 dyes, and the dyes are incorporated in equal amounts. Applications such as colloidal sequencing generally require the use of multiple dyes in different ratios for tagging different particle types and to create optical diversity. Furthermore, the particles used for colloidal sequencing must be compatible with organic solvents and with reaction conditions used for polymer formation. Accordingly, large stable particles having a high number of binding sides and/or porosity would be very useful for this art.

SUMMARY OF THE INVENTION

The invention provides new particle synthesis techniques, new particles made thereby, new solid phase coupling technology, and methods for their use that alleviate the problems listed above. In preferred embodiments, the particles are labeled with a variety of optical tags and are exposed simultaneously or previously to chemical reactions that couple residues, such as nucleic acid bases or amino acids, to growing chains for combinatorial synthesis.

Accordingly, in one aspect, the invention features a solid phase reagent that is stable under conditions of DNA synthesis, including porous organosilica spherical particles having interior and exterior surfaces, wherein the particles have diameters between approximately 0.08 microns and 200 microns, a mean exterior, interior, or total surface area of at least approximately 5 square meters per gram of dry weight (e.g., 7 $m^2$/g, 10 $m^2$/g, or 15 $m^2$/g), and a high level of functionalized groups on the particle exterior surfaces and wherein the interior surfaces are capable of binding molecules. In various embodiments, at least 95% of the particles have a mean diameter between 5.0 microns and 50 microns, between 0.08 microns and 1 microns, or between 10 microns and 200 microns. The particles may further include at least 4 different fluorescent dyes in at least 4 different concentrations, wherein each dye is attached in a form that resists leaching of the dye, e.g., the fluorescent dyes are attached to the interior surfaces by covalent coupling. Desirably, the particles contain pores between approximately 0.1 and 5 microns in mean diameter, wherein at least two of the pores are linked by channels less than 75 nanometers in mean diameter. In other embodiments, the particles include at least 50%, e.g., at least 75%, at least 90%, or 100%, by weight of silane derivative, e.g., a mercapto functionalized silane such as 3-mercaptopropy trimethoxysilane. The silane derivative may also be selected from the group consisting of an X-Y trimethoxysilane and an X-Y triethoxysilane, wherein X is a moiety selected from the group consisting of a thiol, a chlorine, an isothiocyanate, and Y is a carbon chain selected from the group consisting of ethyl, propyl, butyl, pentyl, hexyl, and heptyl. In various embodiments, at least 95% of the particles have at least $3\times10^{19}$ or at least $1\times10^{20}$ binding moieties per gram of dry weight. The reagent may further include colloidal silica particles having diameters between approximately 0.1 and 2 microns, wherein the porous organosilica spherical particles have diameters between 2 and 100 microns. In other embodiments, the reagent further includes an optical tag selected from the group consisting of a fluorophore, a phosphor, a lanthanide chelate, a chromophore, a chemiluminphore, an organosilica particle, a nanocrystal particle, a colloidal particle having an average diameter between 2 nanometer and 100 nanometers, a colloidal particle having an average diameter between 2 nanometer and 100 nanometers labeled with a fluorophore, a colloidal gold particle, a colloidal gold/silver composite, and a colloidal selenium particle. The reagent may further include a moiety capable of attaching an optical tag. Exemplary moieties capable of attaching an optical tag include amino groups, carboxyl groups, thiol groups, antibody fragments, polycationic polymers, polyanionic polymers, avidin, biotin, and polynucleic acid. The porous organosilica spherical particles may further include fluorescent tags covalently attached to the interior surfaces, wherein the fluorescent tags are attached during synthesis of the particles or after particle synthesis by allowing functionalized fluorescent tags to enter the pores after pore formation. In other embodiments, the porous organosilica spherical particles are capable of being optically detected without local focusing. The particles may also contain one or more amino, carboxylic acid, or hydroxyl groups on their surfaces.

In another aspect, the invention features a method of synthesizing porous organosilica spherical particles that are stable to conditions of DNA synthesis. The method includes the steps of mixing acid, water and a silane derivative to form a hydrolyzed silane emulsion, where the silane derivative contains a functional group; and adding a cross-linker catalyst to the emulsion to provide cross-linking. The silane derivative is, for example, an X-Y trimethoxysilane or an X-Y triethoxysilane, wherein X is a moiety selected from the group consisting of a thiol, a chlorine, and an isothiocyanate, and Y is a carbon chain selected from the group consisting of ethyl, propyl, butyl, pentyl, hexyl, and heptyl. Exemplary silane derivatives include 3-mercaptopropyl trimethoxysilane, 3-chloropropyl trimethoxysilane, and 3-isothiocyanatopropyl trimethoxysilane. The cross-linker catalyst is, for example, an amine, such as ammonia, trimethyl amine, triethylamine, dimethylamine, and hexylamine. The cross-linker catalyst may be added while stirring the emulsion. In addition, 3-aminopropyl trimethoxysilane is included as a second silane derivative in the first step. The mixture formed in the first step may additionally include tetraethyl orthosilicate in a weight ratio with respect to the silane derivative of less than 1 to 1. The mixture may also include an added surfactant. In various embodiments, a fluorescent dye, e.g., a fluorescent silane monomer, is added during either step of the method. A functionalized fluorescent dye may be added and covalently incorporated into the particle after dissolution into a suitable solvent and addition in either step or after synthesis is complete. The method may further include the step, during or after either of the above-described stesp, of attaching tags to the inside, outside, or both surfaces of the particles. In certain embodiments, the acid is hydrochloric acid at a final concentration of between 0.1 and 10 millimolar. The silane derivative is mixed, for example, at a final concentration of between 3% and 25% weight/weight in water. Desirably, the silane derivative includes a hydrophobic functional group. The cross-linking step may be carried out in the presence or absence of vigorous stirring. The invention further features a solid phase reagent made by the above-described methods.

In another aspect, the invention features a solid phase reagent comprising porous organosilicon particles having hydrophobic pores, wherein the particles are synthesized from polymerized hydrophobic group functionalized silane and the hydrophobic functional groups line the pores.

The invention further features a method of preparing a set of compounds wherein each compound is built from the sequential assembly of building blocks. The method includes the steps of providing a solid support reagent including organosilica spherical particles that contain more than $1 \times 10^{19}$ exterior surface binding sites per gram of dry weight for covalent binding of a first building block and binding sites for optical tags; providing an optical tag having a distinct optical character; partitioning the particles into a plurality of reaction vessels, wherein each reaction vessel contains a different first building block and a different tag under conditions wherein the building block may form a covalent bond to the solid support reagent, and wherein the tag reagent may bind to the solid support reagent to become an immobilized tag; pooling the partitioned particles; and repartitioning the pooled particles into a plurality of reaction vessels, wherein each reaction vessel contains a different second building block and a different tag under conditions wherein the second building block may form a covalent bond to the first building block, and wherein the tag reagent may bind to the solid support or to an immobilized tag, wherein the optical properties of the tags determine the building block that has been coupled to the surface of each particle. Exemplary optical tags include a fluorophore, a phosphor, a lanthanide chelate, a chromophore, a chemilumiphore, an organosilica particle, a nanocrystal particle, a colloidal particle having an average diameter between approximately 2 nanometer and 100 nanometers, a colloidal particle having an average diameter between approximately 2 nanometer and 100 nanometers labeled with a fluorophore, a colloidal gold particle, an organosilica spherical particle, and a colloidal selenium particle.

In another aspect, the invention features a method for constructing a molecular velcro material on a solid surface including bonding a first polymer to the solid surface; immersing the prepared solid surface into a solution comprising a second polymer; and exposing the solution to free radicals that cross-link the second polymer to the first immobilized polymer. The solid surface is, for example, a silica particle between approximately 0.05 and 50 microns in diameter. The free radicals may be produced by irradiating the solution with gamma radiation or by adding a chemical source of free radicals to the solution.

In various embodiments of any of the above aspects, all or a portion (e.g., greater than about 50%, 75%, 80%, 90%, or 95%) the particles may have a dimension, e.g., diameter, greater than about 0.8, 1, 2, 5, 10, 20, 50, 75, 100, or 150 μm or smaller than about 200, 150, 100, 75, 50, 20, 10, 5, 2, or 1 μm, or both.

The term "porous organosilica spherical particle" refers to a solid or hollow sphere, or other similar configuration comprising silica and carbonaceous material onto which an oligonucleotide, peptide, or any other molecule can be immobilized. In a preferred embodiment, organosilica includes silane and an organic polymer.

The term "solid phase reagent" refers to any organosilica particle having one or more surfaces on which an oligonucleotide, peptide, or other chemical synthesis may be carried out.

By "silane derivative" or "silane coupling agent" is meant a silane having at least one chemical moiety that does participate in polymerization of the silane. This chemical moiety may have a reactive functional group to attach other chemical species to the silane monomer or polymer, e.g., organic molecules.

By "a form that resists leaching of the dye" is meant a form that is tightly bound, e.g., by covalent or electrostatic interaction, such that less than 1% of the dye is removed under experimental conditions.

By "binding moiety" is meant a chemical species or particle to which another chemical species or particle may bind. Examples include thiols, amino groups, antibodies, avidin-biotin, and polymers, such as proteins, antibodies, and nucleic acids.

The term "conditions of DNA synthesis" means conditions commonly used in solid phase synthesis using a commercially available synthesizer, for example, the Pharmacia OligoPilot II or Milligen/Biosearch 8800. Specifically, these conditions are employed for DNA and RNA synthesis utilizing standard phosphoramidite chemistry (see, e.g., *Protocols for Oligonucleotide and Analogs,* Agrawal, S., ed., Humana Press, Totowa, N.J., 1993). A solid-phase reaction cycle for using phosphoramidites in this context includes the following steps: washing the solid support, detritylating, which deprotects the sugar moiety, washing, coupling of a phosphoramidite monomer to the detritylated nucleoside, washing, capping of unreacted/uncoupled support bound phosphoramidite monomer, washing, oxidizing the phosphorus nucleoside linkage, and washing (see, e.g., *Oligonucleotides and Analogues: A Practical Approach,* Eckstein, F. Ed., IRE Press, New York, 1991).

The term "interior surface" means the area of the surfaces of the pores inside the particles. The term "exterior surface" means the area of the particle excluding that of the interior surface.

The term "fluorescent dye" refers to a molecule that exhibits fluorescence, e.g., fluorescein and its derivatives, rhodamine and its derivatives, dansyl, umbelliferone, ALEXAFLOR, and BODIPY.

The term "functional group" refers to a chemical moiety that may be part of a silane derivative or present on a particle surface, including the surfaces of any pores. A functional group may be capable of binding to other chemicals or particles and may, for example, be a mercapto (thiol), chloride, isothiocyanate, amino group, carboxyl group, antibody fragment, polycationic molecule, polyanionic molecule, avidin, biotin, nucleic acid, protein, and any organic or inorganic compound useful in combinatorial synthesis.

The term "high level of functionalized groups" refers to an amount of functionalized groups that exceeds $1\times10^{19}$ per gram of dry particle weight. In a preferred embodiment, the amount exceeds $1\times10^{20}$, e.g., greater than $3\times10^{20}$ per gram of dry particle weight.

The term "optical tag" refers to a molecule or a particle that is detectable by any optical means including but not limited to fluoroscopy, absorbance spectroscopy, transmittance, visual determination, light scattering, epifluorescence microscopy, and fluorometry.

The term "porous" refers to a structure having pores between approximately 0.1 and 5 microns in mean diameter, wherein the pores may be linked by small channels less than about 200 nm, preferably less than 100 nm, and more preferably about 75 nm in diameter.

By "local focusing" is meant within the focal plane of a lens.

Other features and advantages of the invention will be apparent from the following detailed description and the claims.

DETAILED DESCRIPTION OF THE INVENTION

Figure 1:
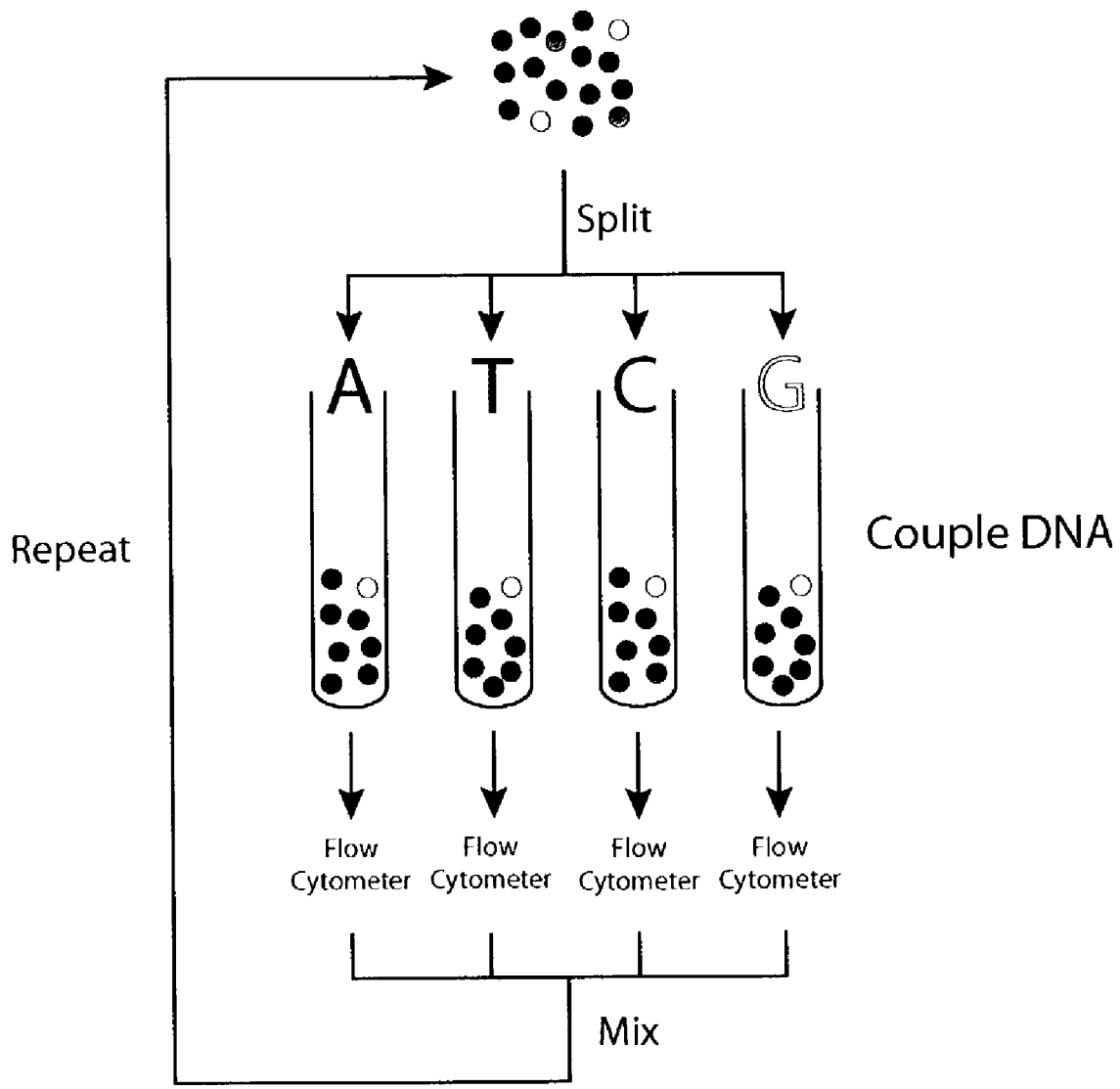
FIG. 1 is an illustration of a large number of compounds being synthesized using a split and mix protocol. A set of optically distinguishable particles are split into four reaction vessels and a different base (A, T, G or C) is coupled to the surface of the particle. A flow cytometer is used to record which particles have had which base coupled to the particle. The particles are then mixed together and split again, and the second base is coupled to the surface. This process is repeated until a library of compounds of the desired size is synthesised.
Figure 2:
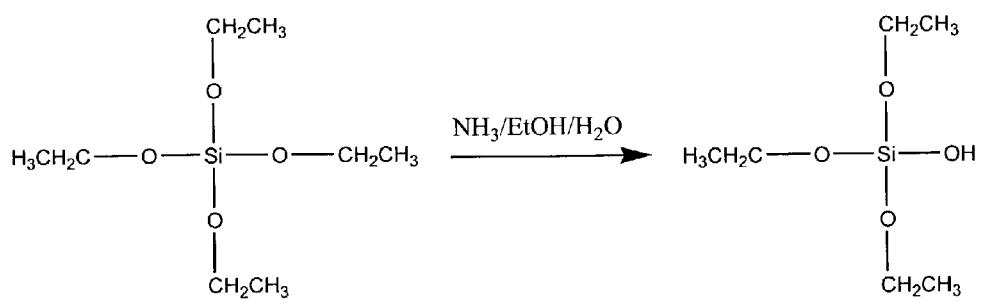
FIG. 2 is a depiction of the steps in the Stober process that involve TEOS hydrolysis and condensation.
Figure 2:
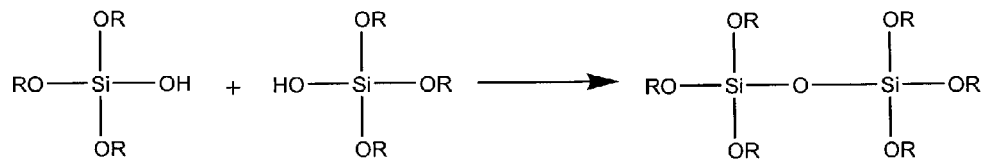
Figure 3:
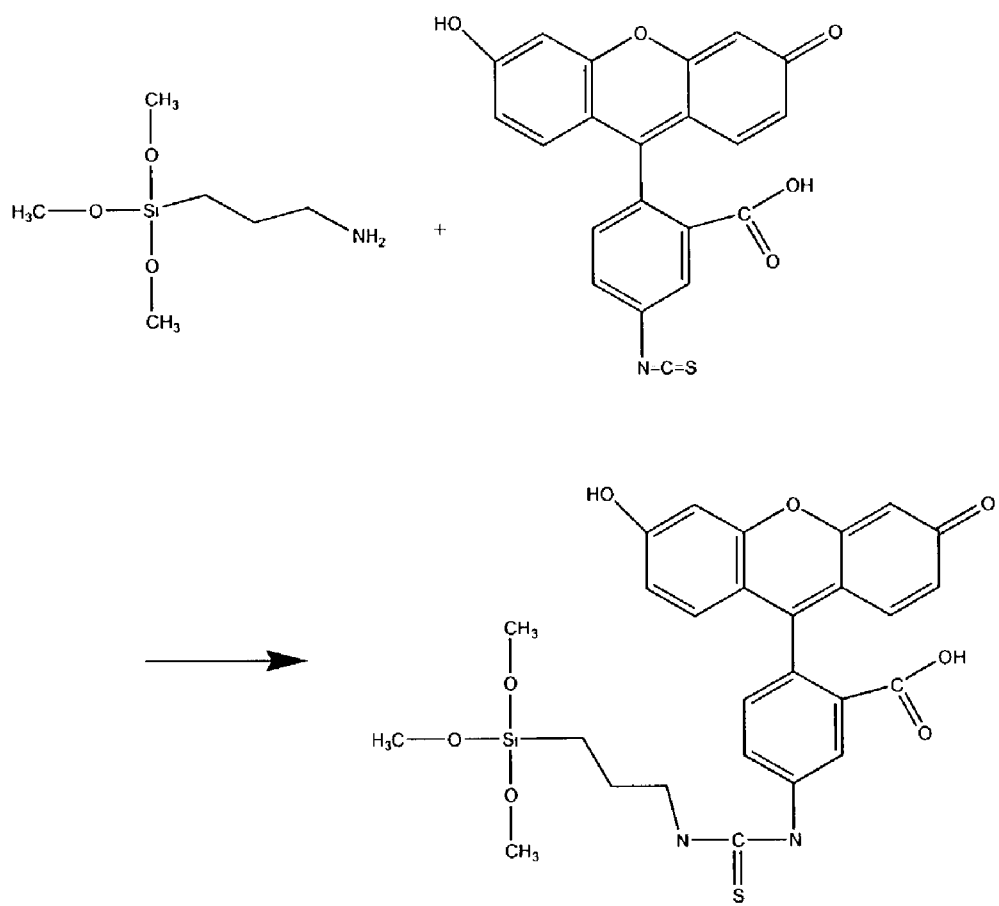
FIG. 3 is a depiction of fluorescent dye coupling to a silane derivative.

While studying acid catalyzed hydrolysis of TEOS and the Stober process, the inventors made several observations and discoveries for altering particle morphology in a desirable way. First, the inventors found that incorporating APS into the reaction mixture increased particle size compared to the use of pure TEOS to form particles. However, instead of acquiring a homogenous shape, the particles made of APS presented a complex internal structure and exhibited poor yield.

In response to this result, the inventors hypothesized that protonation of the amine made the monomer and any subsequent polymer more soluble, and that polymerization of the APS would occur separately from polymerization of TEOS. Silane monomers which were less water soluble than APS then were investigated. These studies revealed that MPS is a useful monomer that can form the desired particles. Based on this insight, the inventors tried increasing the concentration of MPS and discovered that optimal size and yield could be obtained when 100% of the MPS coupling agent was used. However only droplets in an emulsion formed. The inventors then used a TEOS cross-linking catalyst such as NaF to form stable particles by cross-linking the droplets. The inventors further surprisingly discovered that they could improve particle size greatly by removing the surfactant typically present in the reaction mixture. The inventors also discovered that reducing the solution pH provided higher yield of particles.

The inventors explored the properties of the particles and discovered methods of colloidal sequencing that were made possible by the advantageous features of the particles. The high interior surface area is useful because of the opportunities for adding large amounts of visual tag such as a dye or fluor. In particular, the large amount of individual functional groups that can be present in a particle is very helpful in obtaining a greater amount of immobilized polymer during the colloidal sequencing. The larger amounts are helpful for biochemical and other assays for evaluating the different types of particles. By derivatizing with more ligands, for example, a more sensitive ligand assay can be made for testing alternative polymers. These features are particularly useful for colloidal sequencing methods, which are specifically contemplated.

Two Step Procedure for Particle Synthesis

Organosilica particles are formed according to embodiments of the invention by a two step procedure. The first step is formation of an emulsion from mixing (a) acid, (b) water, and (c) a silane derivative to form a hydrolysed silane emulsion. The second step is to add a cross-linker catalyst to the emulsion to cross-link the silane derivative under controlled conditions to make particles of a desirable size.

Step One: Emulsion Formation from Acid, Water and Silane Derivative

A silane in water emulsion may be formed from any of a variety of silane derivative coupling agents known in the art. The silane derivative is hydrolyzed in this step. Optionally, a non-coupling agent such as tetraethyl orthosilicate $((CH_3CH_2O)_4Si)$ may be included. In preferred embodiments, the derivative comprises more than 10%, 25%, 50%, 75%, or even over 90% by weight of the silane composition, including 100%. Mixtures of silanes may be used as suited, but it is most preferred to use large amounts (more than 90%, preferably more than 95%) of functionalized silane to make particles having a high degree of functionalized groups on their surfaces for coupling reactions.

Particularly preferred for embodiments of the invention are silanes having hydrophobic portions, e.g., aliphatic chains. Most preferred are propyl thiol functionalized silanes, as these form particles having hydrophobic pores lined with thiol functional groups. Particles made with hydrophobic pores are very useful in many areas because organic solvents, reagents, or ligands can enter the pores and remain there. A non functionalized silane that may be used sparingly, or not at all in many embodiments, is tetraethyl orthosilicate $(CH_3CH_2O)_4Si$, (TEOS).

Silane coupling agents may have a variety of functional groups and sizes. Preferred for many embodiments of the invention are 3-aminopropyl trimethoxysilane $(CH_3O)_3Si(CH_2)_3NH_2$ ("APS") and 3-mercaptopropyl trimethoxysilane $(CH_3O)_3Si(CH_2)_3SH$ ("MPS"). Similarly, many different types of catalyst are useful. Ammonia (typically from a water solution such as 25% $NH_3$), methyl amine $(CH_3NH_2)$, trimethylamine $(CH_3)_3N$, and cetyltrimethylammonium chloride $CH_3(CH_2)_{15}N(CH_3)_3Cl$ are preferred catalysts for many embodiments. Hydrochloric acid (HCl), Nitric acid ($HNO_3$), and acetic acid ($CH_3COOH$) are preferred acids.

In the most preferred embodiments, a thiol based coupling agent, such as 3-mercaptopropy trimethoxysilane (MPS), is combined with acid reagent and water for the first step of particle synthesis. By altering the length of the alkyl chain of the monomer the morphology of the particles is controlled. For example, increasing the length of the alkyl chain can cause larger channel sizes and decreasing the length of the chain can lead to smaller channels. Silanes having other functional groups can be used, but thiol based silanes are preferred in many embodiments. In practice, the majority of the silane composition, (preferably more than 75%, more preferably greater than 90%, and even 100%) should be made up by the coupling agent. MPS and related thiols are particularly desirable for forming pores that are fairly hydrophobic but which contain a common reactive thiol group.

The emulsion forms when the silane monomer is added to the acidified water solution. As the monomer is hydrolyzed by the acidic solution, the solubility of the monomer is increased, thus the emulsion breaks down. As the reaction is allowed to continue, the monomer polymerizes into short polymer chains, which are less soluble. The short polymer chains separate from the aqueous phase forming an emulsion. For convenience, HCl and the silane(s) may be poured into water, or water co-solvent solution, such as 50% water and 50% of an alcohol, and stirred. Preferably, the emulsion pH is between 1 and 6, more preferably the pH is between 1.5 and 5, and even more preferably the emulsion pH is between 2 and 4.

Most preferably, the emulsion lacks an added surfactant, as it was discovered that omitting a surfactant led to increased particle size. Without wishing to be bound by any one theory of this embodiment of the invention, we believe that when surfactant is present, the surfactant adsorbs to the surface of the droplets and forms a monolayer between the silica and aqueous bulk of the reaction mixture. When a cross-linking catalyst is added to the emulsion, the surfactant interferes with the catalyst reaching the silica in the droplet. Thus, surfactant may be added to control the particle size.

The emulsion may comprise, for example, between 0.05 and 80 percent silane derivative in water solution, between 0.2% and 10% coupling agent, e.g., between 1 and 5% silane derivative in water. The emulsion may be mixed by stirring, sonication, or other means to form the emulsion prior to the subsequent cross-linking step.

Step Two: Cross-Linking by Added Catalyst

After an emulsion is formed, or in some cases during formation, a catalyst is added. Most preferably catalyst is added after a stable emulsion has been achieved. Catalysts for cross-linking are well known and such catalysts are contemplated in embodiments of the invention. Ammonia and other water soluble amines particularly are preferred as catalysts.

Preferably the catalyst is added while the emulsion is stirred or agitated. When synthesizing large particles, the agitation is kept to a minimum. For making small particles, particularly less than 5 microns in diameter, greater agitation is needed. For a given solution condition and temperature, the exact amount of agitation needed for a given size of particle can be determined by one skilled in the art. In one embodiment, a minimum amount of vigorous stirring is used for smaller particles. The term "vigorous stirring" in this context means increasing molecular diffusion by at least the same amount as that experienced within 300 ml of water solution in a standard 500 ml flask at 1000 rpm while stirring with a regular 1 inch long teflon coated magnet (available from Nalgene Corp. U.S.A.).

In one embodiment, stirring is achieved with a flow stream mixer wherein an emulsion stream merges with a stream of catalyst at an angle such as a right angle and where the flow rate of the catalyst solution that is being added is at least 0.1% and preferably between 1% and 10% of the flow rate of the emulsion stream. In another embodiment designed for large size particles, no turbulent flow or mixing is used. In yet another embodiment, the formed particle size is controlled to a larger dimension by use of a non-reactive viscosity enhancer that is dissolved in the water or water-co-solvent solution. In yet another embodiment, a water miscible solvent such as an alcohol is added as needed to adjust viscosity. In still another embodiment, the silane emulsion is injected into the catalyst solution.

Reverse Emulsion Procedure for Making More Highly Porous Particles

A useful variation of preferred embodiments is to reverse the water/oil phases of the normal emulsion process. A reversed phase process can make materials that are even more porous. In this embodiment, the same acid hydrolysis reaction described above is followed by a step that removes most of, and preferably all of, the water. Then, a small amount of water is added back, and the solution is stirred to form a water in oil emulsion (rather than oil in water). The emulsion is brought into contact with a cross-linker by, for example, adding solution to the cross-linker or by adding cross-linker to the solution to form stable cross-linked particles. This procedure provides particles that are even more porous because water is present inside the emulsion droplets before the cross-linking process starts. The reverse emulsion procedure generally uses the same range of materials as described for the oil-in-water emulsion methods for preparing particles.

Use of the Particles

Particles according to embodiments of the invention have numerous advantageous features that engender a wide range of industrial applications.

The particles are mechanically strong and resistant to many organic solvents and reaction conditions. Furthermore, they can be formed having an unusually high concentration of reactive ligands, allowing high binding capacity. This high binding capacity is invaluable for applications that employ combinatorial libraries, where it is desired to link a large number of growing chains to a carrier. For example, the particles described herein may be used in the synthesis of nucleotides analogous to standard methodologies employing controlled-pore glass. The high binding capacity also is very helpful for use in chemical reactors, particularly in flow systems that require a uniform and mechanically rigid bed of particles to which an enzyme or other catalyst may be attached. Resistance to organic solvents is particularly helpful for these systems. Particles according to the invention are specifically contemplated for use in flow bed and other chemical reactors wherein the high binding capacities for catalysts (or intermediary compounds for multi step reactions) and chemical resistance properties are desired.

Yet another attribute of particles according to embodiments of the invention is the large porosity and the ability to easily control the chemical nature of the interior surfaces. In particular, an optical label can be attached to the interior of the particles in high amounts. Particles further may have high porosities. An advantage of the high porosity feature is the ability to adjust the silica particle density, by for example filling the interior with a solvent having a desirable specific density. Yet another advantage of this property provides new avenues for drug delivery. Particle interiors may be loaded with a desired pharmacological compound or other small compound and then released slowly in time or in response to an environmental condition such as pH, temperature, and solvent type. Control of those interiors, especially with thiol functional groups is advantageous and allows high capacity binding in a protected environment that can be adjusted (pH, solvent type) for optimum storage and release of a compound from within the particle interior.

Particles prepared according to embodiments of the invention have adjustable density by virtue of containing a large proportion (at least 10%, preferably more than 25%, more preferably more than 50%) of the particle volume as pores. The high pore volume allows addition of a solvent or other substance of known density to the particles such that, after entering the pores, the particle density is adjusted. The density is set by incubating the particles in a given fluid, such as ethanol, methanol, proplyene glycol, mercury, glycerol, and the like. In one embodiment, the particles are sonicated in the desired fluid to facilitate entry of fluid into the pores.

Use of the particle pore volume by packing the pores with a fluid is particularly useful where the pore fluid differs from the fluid in which the particles are to be suspended. For example, particles that contain a water immiscible solvent in their pores may have a lighter density due to that solvent and can be used in aqueous solution without appreciable loss of the solvent when placed in water. This lighter density may be exploited in some particle technologies, particularly those that rely on buoyancy or centrifugation to separate particles.

In a related embodiment, the particle's pores are filled with a fluid, optionally after adding a visual tag such as a fluorogenic molecule, subsequently rinsed, and then the pore openings treated with a cross-linker to prevent efflux of fluid from the pores. In a preferred embodiment, a fluorescent marker is covalently attached to the interior surface of the particle or added non-covalently in a fluid, and the pores are sealed by coating with a silicon shell. Preferably, shell coating procedures that use TEOS as described by van Blaaderen and as cited in PCT/AU99/01065 are employed. The particles may also be filled with a gas. In a preferred embodiment, the particle interiors are coated with a phosphor or other lumiphore useful for time resolved spectroscopy and then filled with a gas. The gas prevents extensive quenching of the lumiphore, that otherwise would occur if the lumiphore came into contact with a quenching liquid.

In yet another embodiment, a functional group of the silane coupling agent is chosen that has affinity for a desired fluid and thereby helps hold the fluid atoms or molecules within the particles. In yet another embodiment, the particles are prepared having specific densities and a different color for each density. Particles according to this latter embodiment are particularly useful as diagnostic tools in procedures, including automated procedures for separation of particles for colloidal sequencing or other sedimentation separation of molecules and even subcellular organelles. For example, particles having 5 different densities (with 5 different fluorescent colors) can be mixed in a suspension that is resolved by gradient separation and indicate 5 different specific gravities as they form 5 colored bands in a gradient.

In another embodiment, the particles are coated with one or more silica shells during their manufacture. Advantageously, an optical tag is added to the particles prior to coating with a silica shell. In an embodiment thereof, the optical tag is a fluor or phosphor, and the coating increases the optical tag's quantum efficiency, alleviating quenching and red shift of emitted light by blocking water contact with the tag. In another advantageous embodiment, a clear shell of sufficient thickness sets a minimum optical distance between particles that physically may bind to each other, greatly improving the optical resolution of carrier particles having optical tag particles. This latter embodiment is particularly useful for colloidal separation techniques that rely on multiple tags to distinguish a large number of different carrier particles. The clear silica layer helps maintain a separation of visual signals from each other and allows an automated resolving instrument and its software to more easily discriminate a larger number of differently tagged carriers.

In another embodiment of the invention, a particle prepared by the Stober process is coated with a clear silica layer. In this case preferably a small particle between 0.02 and 3 microns and more preferably between 0.1 and 1 micron in diameter is prepared by the Stober process. Fluorescent labels are added, and then a layer of clear silica is added. The clear silica alleviates quenching and also improves the ability to resolve the particles optically by virtue of the clear shell acting as a spacer between the fluorescent tagged reporter tag and the larger carrier opaque particle to which the reporter particles attach. Such particles are preferred in combination with combinatorial chemistry techniques because of the need for optical particle recognition techniques that resolve and count the numbers and types of reporter beads on a carrier, as described in PCT/AU98/00944 and PCT/AU99/01065.

In a corresponding embodiment, different batches of particles are coated with different thicknesses of clear silicon shell, and the differing optic properties from the altered thicknesses are relied on to distinguish the particles. For example, a first group of 0.5 micron average diameter particles are coated with 0.1 micron shell (0.7 micron final diameter), and a second group of 0.5 micron average diameter particles are coated with 0.3 micron shell (1.1 micron final diameter). The first group of particles are optically distinguished from the second group of particles by their different light scattering properties. The second group will more readily scatter 1 micron wavelength light than the first group. Both types are flowed through an imaging flow cell and optic imaging signals are produced that distinguish the different particle types based on their different scattering characteristics.

The scattering properties of the particles can also be altered by incorporation of other materials into the particles either during synthesis (e.g., by incorporating titanium isopropoxide or similar reagent with the silane monomer) or post synthesis. These materials could include Ti and Al to alter the scattering and Fe to give the particles magnetic properties.

In a preferred embodiment, multiple, for example, six, different types of particles are made, each having a different thickness of optic coating. During use, the six types are distinguished on the basis of scattering signals, despite their having the same fluorescent inner regions. This technique is particularly desirable for use in combinatorial chemistry as it provides another factor for distinguishing particle types. The technique of using light scattering for distinguishing different particle types is facilitated by the high porosity of the particles. In a preferred embodiment, the difference in refractive index, more specifically the refractive index profile (e.g. generated by the varying porosity within each particle), gives rise to a unique scattering signature from each particle.

A further advantageous feature for this use is to adjust the interior fluid of the particles by equilibrating them with a fluid having a desired refractive index prior to optical detection. For example, particles that contain water in their interiors can be suspended into a water immiscible solvent of different refractive index without efflux of water from the particles. In another embodiment, light scattering (and discrimination of different sized particles) is enhanced by selecting a process that fills the particle pores with an organic solvent and the particles are suspended in water for taking a light scattering measurement. A skilled artisan can optimize generation of a scattering signal and improve the discrimination of different particle sizes via selection of particle size and solvent types for a given wavelength or wavelength range.

In preferred embodiments, the particles are opaque and exhibit very little background fluorescence. This feature arises from the use of silica in the particles. In a related embodiment, a particle is made more opaque by coupling or adding a fluor or dye to the interior of the particle in an amount sufficient to block light transmission through the particle. Preferably, different fluors are used for different sets of particles so that the interior fluorescence is an optical signal used for particle identification.

A very useful feature of embodiments of the invention is that a synthesized population (i.e., at least 95% of the particles in a preparation made by a process according to the invention) has a desired particle size that is controlled over a wide range. Furthermore, a larger size particle is possible compared generally with that possible using prior art techniques. Most preferred in this context is a reagent (population of particles intended for use) wherein at least 95 percent of the particles have a mean diameter of between 5.0 microns and 50 microns. In other embodiments, a prepared population may have smaller diameters, for example by adding detergent during synthesis, wherein 95 percent of the particles have a mean diameter of between 0.08 microns and 1 micron. In another embodiment, 95 percent of the particles have a mean diameter of between 10 microns and 200 microns. In another embodiment for tagging carrier particles, 95 percent of the tagging particles (also termed "beads") have a mean diameter between 0.4 and 3 microns and couple to the carrier particles, wherein the carrier particle population has an average diameter of between 2 microns and 20 microns.

Non-Chemical Binding of Particles

In a preferred embodiment of the invention, two particles couple by a mechanical intertwining of polymers between them. This technique is termed "molecular velcro" or "m-velcro" in recognition of the mechanical interleaving of string-like oppositely charged polymers ("polyelectrolyte") between the particles. M-velcro, in a broad sense, couples any two solid surfaces, which may, for example, assume the shape of a round or irregular body, a thin flat surface, a flexible flat surface, or a mesh or grid. M-velcro is preferred for bonding round particles contemplated for combinatorial synthesis techniques because M-velcro allows the particles to couple non-covalently yet irreversibly. The bonding is very resistant to chemical reactions and generally is insensitive to non-specific binding reactions. Thus, M-velcro has general use for mechanical bonding in other diagnostic and medical techniques as well.

An "m-velcro" according to this embodiment of the invention comprises a first solid surface that has an outer coating of a first polyelectrolyte and a second solid surface having an outer coating of a second polyelectrolyte of charge opposite to the charge of the first polyelectrolyte. The phrase "outer coating" means that the polyelectrolyte which binds is present at the outer surface of the solid object. In practice, a solid surface may have one or more alternating coatings of polyelectrolyte or other polymer between a hard coating of the surface and the outermost layer. Alternatively, one surface may be coated with polyelectrolyte, and the other surface is not coated. Also a neutral polymer (e.g. polyvinyl alcohol) may be adsorbed onto one surface via hydrophobic or hydrophilic interactions.

A polyelectrolyte useful for these embodiments of the invention may be any known charged polymers, such as those used by polymer chemists, including for example, poly(styrenesulfonate), poly(allylamine) hydrochloride; poly(acrylic acid), polyethyleneimine, poly(diallyldimethylammonium chloride; and dendritic macromolecules such as polyamido dendrimer Generation 10 from Dendritech. In practice, the polymer is bound to the solid surface either directly, by for example electrostatic absorption of cationic polyelectrolyte to a silica surface or covalent coupling, or indirectly through one or more intermediary layers of other polymer. The polymer may also be non-charged (e.g. polyvinyl alcohol) and adsorb via van der Waal's interactions.

The inventors surprisingly discovered that a particularly strong mechanical bond at the microscopic level can be made if the polyelectrolyte is grown into a thick structure by covalent modification and binding with another polymer. In preferred embodiments, m-velcro is prepared by controlled polyelectrolyte multilayer coating of a solid surface. The first polyelectrolyte layer is adsorbed onto the surface from solution (e.g., water with or without the presence of a salt). The surface is washed to remove excess polyelectrolyte and the next, oppositely charged, polyelectrolyte is adsorbed from solution. A third polyelectrolyte layer (same charge as the first layer) can be adsorbed using the same method. Continuing in this way, a chosen number of polyelectrolyte layers can be adsorbed in a controlled manner. The concentration of the polyelectrolyte and the time in which the solution is in contact with the solid surface has a bearing on the amount of polyelectrolyte adsorbed at each stage of the multilayering process.

At any stage of the polyelectrolyte multilayering process, the solid surface can be exposed to gamma irradiation, which enables free radicals to occur along the polymer chains (e.g., scission) and allows the chains to rejoin in a cross-linked fashion. The amount of cross-linking and thickness and 'hairyness' of the polyelectrolyte coats are controlled by the irradiation dosage.

The gamma irradiation of the polyelectrolyte multilayered solid surfaces can be performed in the presence or absence of polyelectrolyte polymers (or monomers) in solution (with or without the presence of a salt). The thickness of the polyelectrolyte layer and the degree in which polyelectrolyte 'tendrils' extend into solution are affected by the presence or absence of polyelectrolyte in solution during gamma irradiation. If the irradiation of polyelectrolyte multilayered solid surfaces is performed with monomers in solution, then the free radicals formed on the monomer molecules can react with free radicals formed on the polyelectrolyte multilayers, thereby forming a branched or dendritic-type coating on the solid surface.

In another embodiment, the polyelectrolyte polymers can be attached to the solid surface through covalent bonding rather than the physical adsorption method. An initiator (e.g., 2,2' azo bis(2-methylpropionamidine dihydrochloride)) is used to covalently couple the polyelectrolyte polymer (e.g., polyacrylic acid), at elevated temperature (e.g., 70° C.) to the solid surface. Alternatively, an initiator is used to couple monomers from solution (e.g., acrylic acid) to the solid surface, at elevated temperature (Yoshinaga et al., Poly. Bull. 1992, 28, 663-668).

M-velcro coupling of carrier particles and reporter beads is particularly desirable for combinatorial chemistry techniques because, the beads remain attached to the carrier particles in a wide variety of reacting solvents used for combinatorial chemistry. This was found to be a major advantage over previous techniques of bridging flocculation used by others. Even when the carried particle swelled as result of solvent change, the m-velcro binding between particles persisted. In one advantageous embodiment, silica carrier particles made according to embodiments of the invention and having diameters of at least 3 microns contain a polyanionic surface as synthesized. Silica reporter beads are synthesized with diameters of 1 micron or smaller and coated with cationic polyelectrolyte. The reporter beads couple to the carrier particles and remain coupled despite exposure to organic solvents used for nucleic acid polymerization reactions.

M-velcro was used successfully to bind carrier particles with reporter beads over a wide range of conditions. Polyelectrolytes were used over a wide size range. Preferably the polyelectrolyte has a molecular weight of between 5,000 and 1,000,000 and more preferably between 10,000 and 250,000. Multilayers of polyelectrolyte may be used wherein alternate layers are oppositely charged. Alternate layers may be built by soaking the solid phase in a high concentration (preferably 1 microgram per ml to 100 mg/ml, more preferably 0.1 to 10 mg/ml) of polyelectrolyte having a charge that is opposite to the surface of the solid phase. After one or more layers are added, free radical cross-linking with solution phase polyelectrolyte is favored to make the layer thicker. The cross-linking also improves adhesion strength of the m-velcro in different solvents.

In another embodiment m-velcro is formed by soaking the solid phase in a solution of monomer such as acrylic acid and initiating a free radical reaction, which causes monomers to form a polymer. One or more polyelectrolytes can be added during synthesis of the solid phase and preferably are incorporated into the solid phase matrix, with a portion extending out. Dendrimers also specifically are contemplated in embodiments of the invention and can be grown off the surface of the solid phase. In each embodiment for formation of m-velcro it is particularly preferred that the polymers be cross-linked and/or synthesized to maximize the thickness and hairiness of the surface. In embodiments of the invention, m-velcro is used for other diagnostic techniques. In one such use, binding reactions between a target solute and one or more binding partners are arranged in solution so that an optical signal is produced in a readout step to indicate the presence or absence (or amount) of the target. In many cases, a solid surface is used for one or more binding reactions, and the visual signal is detected from that surface. To facilitate favorable binding kinetics a small diffusable solid phase such as a colloidal particle or microparticle is used. In such instances, it is advantageous to use m-velcro to collect the solid phase at a local area for the detection step. For example, a visual detection area in a flow stream may be coated with an anionic polyelectrolyte that has been made hairier by free radical catalyzed cross-linking. A microparticle that contains the products of an enzyme linked immunosorbant assay in the flow stream and which is coated with a cationic polyelectrolyte becomes bound to the anionic polyelectrolyte, concentrating the signal. Of course, in this and in other embodiments one or more reactants such as a protein, short polypeptide, nucleic acid or other molecule may also be attached to the polyelectrolyte layer.

M-velcro may be used in medical devices that require bonding of two or more surfaces within the body. In a preferred embodiment, the solid surfaces degrade in the body after they no longer are needed. Presently many devices are used in medicine that require attachments of some kind. For example, macroscale holding, zipping, and/or chemical gluing of materials inside an organism are used to fix an introduced material in a desired location but are less reliable than m-velcro because of unwanted interactions with complex fluids found in the body. In contrast, surfaces that contain m-velcro can bind each other very tightly, even in the presence of body fluid such as interstitial fluid or blood.

When used in medicine, a surgeon contacts oppositely charged polyelectrolyte coatings of m-velcro to each other at the time a bond is desired. By way of example, a tiny blood vessel or nerve bundle may be wrapped with a section of a cationic polyelectrolyte m-velcro sheeting wherein one edge has an anionic polyelectrolyte coating. The surgeon slips the cationic polyelectrolyte side of the sheeting under the damaged blood vessel or nerve bundle and then presses on the anionic polyelectrolyte edge. In this embodiment the solid surface may have perforations or may consist of a mesh or screen that is coated with polyelectrolyte.

Colloidal Sequencing

In a particularly preferred embodiment that exploits the high derivitization capacity of the particles, the particle surfaces become tagged with optical markers and are used in colloidal sequencing. Derivatization of the particles and their use in this context are described by Trau et al. in WO 99/24458, hereby incorporated by reference. This reference teaches carrier-reporter bead assemblies and their use in relation to oligomer libraries, e.g., synthesis of libraries of oligonucleotides, oligopeptides, oligosaccharides, and small organic compounds.

Large carrier bead particles at least one micron in diameter are useful for colloidal sequencing. In advantageous embodiments, carrier particles are contemplated for colloidal sequencing with diameters greater than 3 microns, preferably greater than 5 microns in diameter. Desirably the particles are less than 25 microns and preferably less than 10 microns in diameter. The procedures shown in PCT/AU99101065 (Battersby et al.) are most preferred for this use. Most desirably for colloidal sequencing, larger sizes of particles are made with no or slow agitation during step two of the synthesis procedure. Such large particles are very useful as "carrier" beads, particularly as defined on pages 15 to 23 of the Battersby et al. reference.

Tagging (Labeling) the Particles

The carriers used in colloidal sequencing may be tagged by any of a number of techniques both covalent and non-covalent. Particularly preferred is to couple tags to a bead that provide a unique visual indication of the bead as described, for example in the Battersby et al. publication and in the Trau publication PCT/AU98/00944. The visual indication may be detectable through, for example, fluoroscopy, absorbance spectroscopy, light scattering, transmittance, visual determination, epifluorescence microscopy, or fluorometery. An exemplary instrument for detecting optical tags is a sort computer as described in U.S. Provisional Application No. 60/330,759, hereby incorporated by referenced. Other instruments for detection of tags, e.g., fluorometer or hyperspectral imager, are known in art. Suitable tags, such as fluorescent dyes include fluorescein with its derivatives, rhodamine and its derivatives, dansyl, umbelliferone, ALEXFLOR (from Molecular Probes Inc.) and BODIPY (from Molecular Probes Inc.). Additional dyes are known in the art.

Additionally, other favorable properties of the particles can be relied on to generate or modulate signals for distinguishing particles. In particular, it will be appreciated that the size of particles used (both carrier and/or optical tag particle) will generate different light scattering signals. Those specific scattering signals may be used to distinguish particles. For example, a larger particle will be distinguished from a smaller particle because the smaller particle will refract light at different wavelengths than a larger particle. Moreover, particles with different refractive index profiles will generate different scattering signatures (e.g. as will result from different porosity profiles).

A tag may be attached to a particle for optical detection via alternative coupling means. A variety of coupling reactions are known to skilled artisans, including coupling to a chemical moiety on the particle surface, such as an isothiocyanate, amino group, carboxyl group, thiol group, antibody fragment, polycationic molecule, polyanionic molecule, avidin, biotin, nucleic acid, protein, and any organic or inorganic compound useful in combinatorial synthesis.

A particularly preferred form of attaching a tag that generally does not interfere with other reaction processes and that limits non-specific binding is through a molecular velcro physical process. An early experiment relating to this process is described in Trau and Bryant, WO 99/24458 "Carrier-Reporter Bead Assemblies," hereby incorporated by reference.,In particular, pages 23 to 26 and page 46 to 47 of this reference describe a preferred procedure for how to make reporter beads that bind through polymers that have been treated with radiation.

The tags may be incorporated during particle synthesis. For example, a fluorescent compound may be added to the reaction material used to prepare particles during the first or second step of the two step procedure. A tag can be covalently bonded to a coupling agent such as MPS. Fluorescein isothiocyanate, ALEXAFLOR and BODIPY are preferred tags for covalently coupling to MPS. The tag may be coupled covalently or non-covalently to the interior or exterior of the particles during synthesis.

The tags may be incorporated during particle synthesis by any of the procedures and materials that are known in the art. For example, a fluor may be added non-covalently or covalently to the interior in step one, step two, or both steps of the synthesis as described above.

The synthesis, selection, and identification of polymers such as amino acid polymers, nucleic acid polymers, and sugar polymers are well described in the art. The extra demands of these techniques made on the solid phases are well addressed by embodiments of the invention. In particular, particles according to embodiments of the invention are very useful for these techniques because of their resistance to solvents and reactants used for polymerization reactions and the high coupling capacities made possible by the high concentration of functionalized silane used in particle synthesis.

The following examples are presented by way of illustration and not by way of limitation.

For the following examples, tetraethyl orthosilicate (($CH_3CH_2O)_4Si$, TEOS 99.99%, Aldrich) and the silane coupling agents 3-aminopropyl trimethoxysilane (($CH_3O)_3Si(CH_2)_3NH_2$, APS 97%, Aldrich) and 3-mercaptopropyl trimethoxysilane (($CH_3O)_3Si(CH_2)_3SH$, MPS 97%, Aldrich and Lancaster) were used as received. Ammonia (25% $NH_3$ solution, AnalR), hydrochloric acid (35% HCl, AnalR), methylamine (41% $CH_3NH_2$ solution, Fluka), trimethylamine (44% ($CH_3)_3N$ solution, Fluka), fluorescein isothiocyanate (FITC, Aldrich), cetyltrimethylammonium chloride (25% $CH_3(CH_2)_{15}N(CH_3)_3Cl$ solution, CTACl, Aldrich), and NaF (AnalR) were also used without further purification. Absolute ethanol and MILLIQ water were used as solvents.

EXAMPLE 1

This example describes surfactant based particle synthesis. One and four-tenths ml of HCl and 5 ml of CTACl were added to 60 ml of water and the solution was stirred well. One ml of silane (TEOS and coupling agent mixture) was added and the solution was allowed to stand for 5 days. A cross-linking catalyst (NaF or $NH_3$) was added to the samples indicated after this period. The particles were then analyzed using transmission microscopy. The results are shown in Table 1.

TABLE 1 Surfactant based particle synthesis

Use of the thiol based coupling agent MPS in the synthesis of the particles, appeared to have little effect on particle morphology at low coupling agent ratios (MPS:TEOS less than 1:10). However, at higher ratios, the particle size increased to the point where an optimal size and yield was obtained at 100% MPS coupling agent.

TABLE 1

Surfactant based particle syntheis

| Sample | TEOS | Coupling Agent | Catalyst | Particles |
|---|---|---|---|---|
| 1 | 1 ml | — | — | ~10 μm |
| 2 | 0.9 ml | APS, 0.1 ml | — | ~30 μm, poor yield |
| 3 | 0.9 ml | MPS, 0.1 ml | — | ~10 μm |

TABLE 1-continued

Surfactant based particle syntheis

| Sample | TEOS | Coupling Agent | Catalyst | Particles |
|---|---|---|---|---|
| 4 | 0.5 ml | MPS, 0.5 ml | — | Gel |
| 5 | 0.1 ml | MPS, 0.9 ml | — | ~40 μm emulsion |
| 6 | — | MPS, 1 ml | — | ~50 μm emulsion |
| 7 | — | APS, 1 ml | — | none |
| 8 | — | MPS, 1 ml | NaF, 0.1 M | ~40 μm + junk |
| 9 | — | MPS, 1 ml | $NH_3$, 0.1 M | ~40 μm + junk |

EXAMPLE 2

This example demonstrates another particle synthesis technique. Using various concentrations of MPS, HCl, surfactant, and cross-linking catalyst through a series of experiments, additional methods of particle formation were demonstrated. The total volume of the mixture was kept constant (10 ml), and ammonia (1 M) was added after 4 days. Table 2 shows the results.

Table 2 shows the importance of adding a cross-linking agent ($NH_3$ in this example) in the second step. When a known TEOS cross-linking catalyst, such as NaF or $NH_3$ was added to the emulsion, the droplets cross-linked to form stable particles. Particles formed from this process are not ideal, because in the process of cross-linking a lot of 'junk' silica is formed, which is not easily separated from the desired particles. Additionally, the particles formed in this process have a tendency to be less spherical. It was found that the addition of ethanol to the reaction mixture immediately after the addition of the catalyst limited the amount of 'junk' silica formed, and thus enabling the desired particles to be isolated more easily.

TABLE 2

| MPS | HCl | CTACl | $NH_3$ | Stirred | Particles |
|---|---|---|---|---|---|
| 800 μl | 100 μl | 100 μl | 10 ml | no | ~40 μm + junk |
| 800 μl | 100 μl | 10.0 μl | 10 ml | yes | Very fine, randomly shaped |
| 800 μl | 100 μl | — | — | yes | Solid gel |
| 800 μl | 10 μl | — | — | yes | Solid gel |
| 800 μl | 1 μl | 10.0 μl | 10 ml | yes | Very fine particles |
| 800 μl | 0.1 μl | 1.0 μl | 10 ml | yes | Very fine particles |
| 800 μl | 0.1 μl | — | 10 ml | yes | ~50 μm particles |
| 8.0 μl | 1 μl | — | 10 ml | yes | ~30 μm particles, poor yield |

EXAMPLE 3

This example describes a further optimized particle synthesis procedure. A 110 microliter volume of 35% HCl was added to 10 ml of $H_2O$ to form a 0.1 M solution. An 800 microliter volume of this solution was added to 80 ml of water and 10 ml of MPS. The solution was stirred at 2000 rpm for 2 days. A 750 microliter volume of 25% $NH_3$ solution was added to 100 ml of $H_2O$, and the MPS solution that had been stirred for two days was added slowly. Immediately, the MPS reaction vessel was rinsed with about 75 ml of ethanol, which was then added to the ammonia-MPS solution. The milky mixture that formed remained unstirred for 5 minutes, allowing the large silica particles to settle. The top 200 ml of solution was removed, and 150 ml of ethanol was added. The solution was allowed to settle again, and the top 100 ml of solution was removed. The mixture was filtered in a buchner funnel under vacuum with Whatman type 13 filter paper. The collected particles were rinsed with ethanol and dried under vacuum for 5 min. The large porous organosilica particles were then collected from the filter and resuspended in 3 ml of ethanol.

EXAMPLE 4

This example describes a further optimized particle synthesis procedure. A 110 microliter volume of 35% HCl was added to 10 ml of $H_2O$ to form a 0.1 M solution. An 800 microliter volume of this solution was added to 80 ml of water and 10 ml of MPS. The solution was stirred at 2000 rpm for 2 days. One ml of 25% $NH_3$ solution was added to 10 ml of $H_2O$ in a 50 ml centrifuge tube. Six mls of the MPS solution that had been stirred for two days was injected into the $NH_3$ solution, and 35 ml of ethanol was immediately added. The mixture was shaken vigorously, and the particles were centrifuged at 600 g for 1 minute. The supernatant was removed, and the particles resuspended in 30 ml of ethanol. The particles were centrifuged again, and the pellet resuspended in 30 ml of ethanol.

The particles were separated by size using Millipore nylon net filters. The solution of particles was passed sequentially through 60-, 30-, 20- and 11-micron filters with the particles retained on each filter being kept and resuspended in approximately 5-10 ml of ethanol.

EXAMPLE 5

This example demonstrates the influence of emulsion age and catalyst type on particle morphology. NMR and visual observations were used to judge the effects on morphology. Solution phase NMR was carried out simply by placing a 700 microliter sample of the reaction solution in an NMR tube, after 2 hours and after 2 days. Solid state NMR analysis was performed on a sample of 150 mg of dry particles.

Optical observations of particle formation were recorded with a video camera attached to a transmission microscope. A drop of the MPS emulsion, formed as above, was placed on a concave microscope slide. A drop of cross-linking catalyst was added to the slide, and the process was recorded at 20 frames per second for 15 seconds. The results are shown in Table 3.

The results summarized in Table 3 indicate that an added cross-linker (ammonia, or another water soluble amine) caused the formation of stable particles from the emulsion. When the cross-linker was added, dark spots appear within the emulsion droplets, and the dark spots were swirled around until the cross-linking process is completed.

TABLE 3

Catalytic Cross-linking

| Emulsion Age | Catalyst | Concentration | Morphology |
|---|---|---|---|
| 1 day | $NH_3$ | 1 M | Medium sized droplets swirled quickly |
| 1 day | $NH_3$ | 0.1 M | Medium sized droplets swirled slowly |
| 1 day | $CH_3NH_2$ | 1 M | Fine droplets swirled quickly |
| 1 day | $CH_3NH_2$ | 0.1 M | Fine droplets swirled quite slowly |
| 2 days | $NH_3$ | 1 M | Medium sized droplets swirled slowly |
| 2 days | $NH_3$ | 0.1 M | Medium sized droplets swirled very slowly |
| 2 days | $CH_3NH_2$ | 1 M | Fine droplets swirled quickly, core formed |

TABLE 3-continued

Catalytic Cross-linking

| Emulsion Age | Catalyst | Concentration | Morphology |
|---|---|---|---|
| 2 days | $CH_3NH_2$ | 0.1 M | Fine droplets swirled quite quickly |
| 2 days | $(CH_3)_3N$ | 1 M | Larger droplets swirled slowly |
| 2 days | $(CH_3)_3N$ | 0.1 M | Larger droplets swirled very slowly |
| 3 days | $NH_3$ | 1 M | Medium sized droplets not swirled |
| 3 days | $CH_3NH_2$ | 1 M | Large and small droplets, significant swelling |
| 3 days | $(CH_3)_3N$ | 1 M | Medium sized droplets not swirled |

EXAMPLE 6

Particles produced by the methods described in Example 5 with cross-linking (using ammonia) were studied by a number of techniques.

The particles produced were mechanically strong and highly cross-linked. Observations were made from study with silicon-29 NMR, which indicated cross-linking of the short polymer chains in the particles. When solid state NMR was used, the distinction between the $T_1$, $T_2$ and $T_3$ silica peaks were still readily apparent. No significant peak due to the monomer ($T_0$) was observed and the most significant peak in the spectrum was the most condensed silica species ($T_3$, −68 ppm) which was present at a ratio of about 3:2 with the $T_2$ peak (−58 ppm), indicating a condensed state of the prepared silica.

The prepared particles also were examined with an electron microscope. When particles were transferred from water to other solvents, such as ethanol, acetonitrile or pyridine, the particles turned from opaque to translucent as the new solvent gradually penetrated the particles. This result indicates the presence of pores throughout the particles, which selectively allow different solvents to penetrate. That is, the ability of different solvents to penetrate into the pores is controlled by altering stirring conditions, use of different silane starting materials, and (optionally) by using a reverse emulsion procedure as described above for increased porosity.

In embodiments of the invention, the porosity properties are exploited by controlled diffusion into and out of particles as suited according to solvent type. In one embodiment, the particles make up a drug delivery system, wherein the desired drug is pre-loaded into the particle pores and diffuses out over a period of time after exposure to a body fluid such as blood, interstitial fluid, or the intestinal lumen. An example of this embodiment is a transdermal nicotine patch applied to the exterior skin wherein nicotine or a related compound is loaded into the particle interior spaces and then diffuses out of the patch during skin contact. Another example is the sustained release of a reproductive hormone or hormone analog for birth control wherein the particles are implanted in an immobilized form under the skin and slowly release their contents.

A nitrogen absorption assay of prepared particles was carried out by cooling a particle sample to liquid nitrogen temperature and measuring the amount of nitrogen absorbed. The amount of nitrogen adsorbed (using BET) was found to be equivalent to 70 square meters per gram. The majority of this adsorption surface showed slow kinetics, indicating small pore size.

Scanning electron microscopy of the particle surfaces showed the surfaces to be smooth. Closer inspection showed that the surfaces had small bumps and immediately under the bumps were pores. A high-resolution scanning electron microscope analysis indicated fine channel structures that link the large pores. The channels were found to be approximately 30 nanometers in diameter.

EXAMPLE 7

The use of a clear silica shell on reporter beads may be used to improve performance of carrier reporter bead assemblies for oligomer libraries. In this example, fluorescent dyes were attached covalently to surfaces of the reporter beads, which were imaged after their binding to opaque carrier beads.

Reporter beads less than 5 microns in diameter were prepared by a modified procedure of Example 3 wherein step two of the synthesis was carried out with vigorous stirring to create a smaller particle size of approximately 0.5 microns average diameter. The 100 ml ammonia in water solution was stirred vigorously with a 1-inch regular Teflon coated stir bar at high speed. While stirring, MPS solution that had been stirred for two days was added slowly. Immediately, the MPS reaction vessel was rinsed with 75 ml of ethanol, which was added to the ammonia-MPS solution. The milky mixture that formed was stirred for an additional 5 minutes. The small particles that formed were removed by centrifugation and washed three times with water by centrifugation and then resuspended in 1:1 water and ethanol.

The reporter beads were split into six batches. Each batch was incubated with a different isothiocyanate fluorescent dye derivative. The particles were washed in water twice and then in ethanol twice.

The dyed reporter beads were coated with a clear silica layer of TEOS as follows. One hundred microliter portions (10% w/w) were suspended in 10 ml of 1:1 water and ethanol solution. Then 1 ml of ammonia and 0.5 ml of TEOS were added quickly with stirring. Stirring continued for five hours. The particles were washed in water twice and in ethanol twice.

The TEOS coating step was repeated at least once more until the reporter bead particles grew to an average diameter of one micron (0.5 micron diameter colored center with a 0.25 micron thick clear layer on top).

For a control, another set of reporter beads were prepared the same way, but without the TEOS coating step. The control reporter beads were only 0.5 microns in diameter and lack a clear shell.

The reporter beads (both experimental clear coated and control beads without a clear coat) had negative charges and were coated with a cationic polyelectrolyte as follows. The dendritic cationic polyelectrolyte polyethylenimine ($M_n$=750,000) was mixed (3 ml of 1% polyelectrolyte solution in water) with 10 mg (dry weight) of reporter beads by sonication for 30 minutes. The suspension was equilibrated for 24 hours and then washed thoroughly six times with three ml of water.

The carrier particles had no polyelectrolyte on their surfaces but contain negative charges. The carrier particles and reporter beads, which contain cationic polyelectrolyte, were combined in different ratios from 1:1 to 1:10 (carrier to reporter). Sequential addition of different reporter beads having up to three different bound fluors were carried out with carrier beads. The complexes were examined by microscopy. Particles were imaged using a SPOT Diagnostic Instruments camera attached to an inverted fluorescence microscope (Olympus IX70). The microscope was equipped with filters to distinguish the fluorescent signals generated by the fluors used in the particles. Images of the particles, using magnifications from 200 to 600 times were further analyzed by computer with Image-Pro Plus 4.0 software.

It was observed that carrier-reporter complexes made from 1 micron diameter reporter beads having a clear shell were more easily distinguished visually and by operation of the computer compared to complexes made from 0.5 micron diameter reporter beads that lacked a clear shell. A clear space between reporter beads and carrier particles improved resolution for the clear coated reporter beads over the uncoated beads. It was further observed that the fluorescence emission spectrum of signals produced by the silica coated 1 micron diameter particles was more reproducible and not shifted to a longer wavelength from solvent quenching, in comparison with the control reporter beads that lacked the clear silicon coating. These results further indicated that sharp images were formed because small reporter beads in front of large carrier particles were visualized easily because of the opacity of the carrier particles.

The coated carrier particles and the coated reporter beads were used in making a combinatorial library as described above. The number of possible combinations that can be made and distinguished by automated optical detection was found to be at least twice as high when 1 micron diameter clear coated reporter beads were used for labeling compared to that seen with use of the 0.5 micron non coated reporter beads.

EXAMPLE 8

Fluorescent dye may also be incorporated into particles during their formation, for example, by the following exemplary procedure.

Synthesis of fluorescent silica colloids. Monochromatic fluorescent silica colloids are synthesized using a modified procedure from Van Blaaderen et al. *Langmuir* 8, 2921 (1992), Verhaegh et al. *Langmuir* 10, 1427 (1998), and Imhof et al. *J. Phys. Chem. B*. 103, 1408-1415 (1999). A series of colloidal dispersions, containing increasing amounts of the dye FITC are prepared. Similar dispersions of monochromatic silica colloids of varying intensity are prepared using dyes, A350, A430, XRITC, NFSE, and DPITC.

Two mg of dye were added to a mixture of 125 µl of EtOH and 1.63 µl of APS and stirred at room temperature overnight. A solution of 7.5 ml of EtOH and 850 µl of NH$_3$ was cooled in a round-bottomed flask to about 0° C. The previously prepared dye mix was added to this solution with vigorous stirring. 330 µl of TEOS was added drop wise over 5-10 minutes, and the reaction allowed to proceed for three hours (keeping the temperature at around 0°C.).

After 3 hours, the particles formed were centrifuged down, and the particles were washed twice with 10:1 ethanol:ammonia solution. The particles were resuspended in 120 ml of 10:1 ethanol ammonia solution, and cooled to 0° C. 2.5 ml of TEOS was then added drop wise. The mixture was stirred at 0° C. for 3 hours and allowed to react at room temperature for a further 12 hours.

The particle solution was diluted with 250 ml of ethanol, and the solution was stored at 0° C. until required. The particlesare cleaned by centrifugation as above.

Fluorescence Spectroscopy. Fluorescence excitation and emission spectra of the dyes, either incorporated into silica colloidal particles or bound in layers on commercial microspheres, are recorded on a luminescence spectrometer (Perkin Elmer Model LS50B) using FL WinLab software. Scans are taken typically between 350 nm and 720 nm at a rate of 200 nanometers per minute. Particles are suspended in dimethylformamide for fluorescence spectroscopy because its refractive index (1.43) is close to that of the silica particle (1.45) and this minimizes scattering effects during absorption and emission. Stock dispersions contain an equal concentration of silica to permit direct comparison.

Multi-fluorescent silica particles are reproducibly prepared by incorporating multiple fluorescent dyes into silica colloidal particles during particle synthesis. When coated with polyelectrolyte and studied as colloidal agents in making combinatorial libraries as described in Example 7, it is found that fluorescent signals, based on both differing amounts and different fluorescence characteristics from internal tags present in silica particles allow a high degree of optical discrimination.

EXAMPLE 9

Silica particles made from 100% MPS are prepared as described in Example 3. After washing, 5 mg of particles were placed in a vial and a solution of ethanol (500 microliters) and fluorescein isothiocyanate (1 milligram) were added. The dye solution was removed from the vial after 10 minutes. The particles were washed in ethanol five times. The vial was then placed in an ultrasonic bath for one hour, and the particles washed 3 times. A sample of particles was photographed with a fluorescence microscope, and the images were analysed with image analysis software.

The amount of dye incorporated into the particle was controlled by allowing the dye to absorb into the particle for different periods of time. This same procedure also was used to incorporate subsequent dyes into the silica particles following addition of the first dye.

The dyes were firmly attached to the particles. A very high amount of dye was incorporated by virtue of the high amount of thiol groups available on the particle surfaces from the MPS. The particles are used for combinatorial synthesis techniques after attaching a linker to them for synthesizing polymer.

EXAMPLE 10

As described above, reporter beads may be coated with polyelectrolyte. In one exemplary procedure, fluorescent silica microspheres (10 mg, 1 micron diameter) were coated with polyelectrolytes as follows. The silica first was coated with positively charged polyethyleneimine (PEI) by sonicating for 30 minutes in a 1% aqueous solution of PEI (3 ml, Polysciences Inc., MW 10,000) and leaving for 24 hours. The particles were washed 5 times with 3 ml of water each time. The washed silica was added to 3 ml of a 1% aqueous solution of negatively charged polyacrylic acid (PAA, Sigma-Aldrich, MW 250,000) and, after 24 hours washed again with 3 ml of water five times. The prepared beads were washed five times with 10 ml of dimethylformamide (DMF) and used as a suspension at 10 mg per ml of DMF.

Free radical cross-linking with additional polyelectrolyte in solution phase was carried out with gamma radiation as follows. Silica beads (10 mg, 1 micron in diameter) were added to 3 ml of an aqueous solution of 1.2 percent by weight PEI (MW 10,000, Polysciences Inc.) and sonicated for 30 minutes. The reporter solution was left for 24 hours at room temperature to allow adsorption of PEI onto the reporters. The reporters were washed with 3 ml of water 5 times to remove unbound PEI and were resuspended in 3 ml of a 0.75% aqueous solution of PAA (MW 250,000, Sigma-Aldrich). Nitrogen gas was bubbled through the solution for 30 minutes to remove oxygen, which could act as a scavenger for the radicals formed under gamma irradiation. The solution then was placed in a gamma cell for 1.5 hours at a dose rate of 8 kG/hour for a total dose of 11.5 to 12 kG. The reporters were washed again 5 times with 3 ml aliquots of water and 5 times with 3 ml aliquots of DMF and then stored in a solution of DMF.

EXAMPLE 11

The class of organosilica particles which are presented in this example are ideal as colloidal supports for combinatorial DNA library synthesis. Our novel colloid synthesis technique enables production of extremely large numbers of porous support particles that are optically distinguishable when passed through a flow cytometer.

The particles are synthesised using a thiol modified silane monomer (3-mercaptopropyl trimethoxysilane) using a two step process. The silane is hydrolyzed in an acidic solution for between 5 and 72 hours to form an activated emulsion of the monomer. The activated emulsion is then added to a basic solution which catalyses the condensation of the silane monomers to form highly cross-linked polymer chains.

Figure 4A:
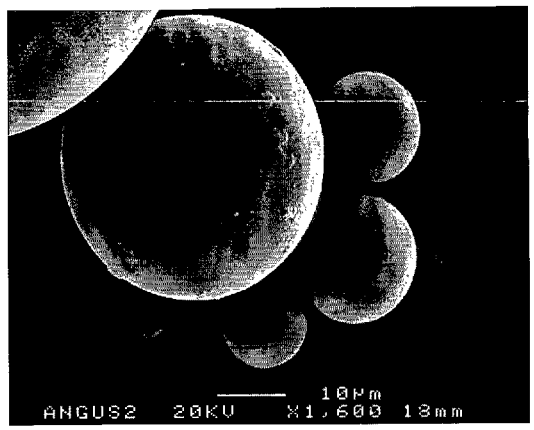
FIGS. 4A and 4B are SEM images of the surfaces of a particle. 4A) The smooth surface of the particles is seen at low magnification (10,000×), but 4B) at high magnification (150,000×) reveals the rough surface of the particles.
Figure 4B:
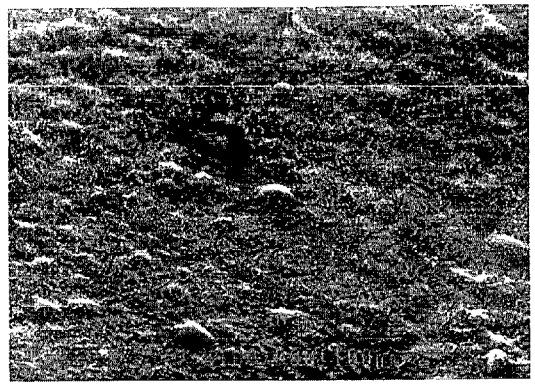
Figure 5A:
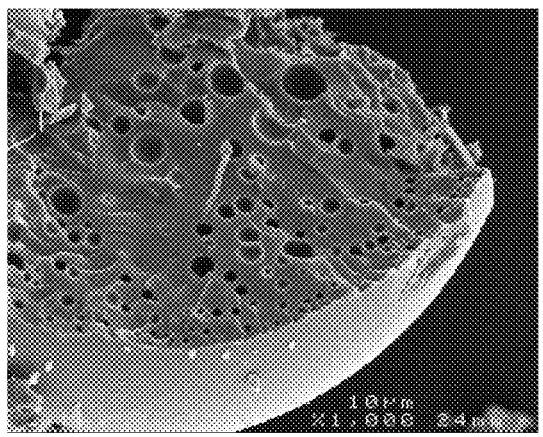
FIGS. 5A and 5B are SEM images of the interior of particles. 5A) A low magnification (10,000×) image of a fractured particle shows the large pores present in the particles, and 5B) the high magnification (150,000×) image show the network of fine channels which links the large pores.
Figure 5B:
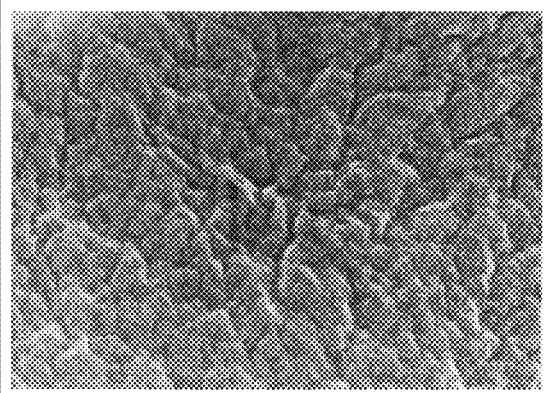

The structure of the particles formed has been investigated using high and low resolution scanning electron microscopy (SEM). Using SEM at low resolutions, the surface of the particles appears smooth, however, high resolution SEM revealed that the surface of the particle is quite uneven, with many small pimples all over the surface (FIG. 4). The SEM of a fractured particle revealed an interesting internal structure. Within the particles, a large number of pores are present, ranging in size from less than 1 μm to more than 10 μm. Between the large pores, high resolution SEM showed fine channels, around 20 nm in diameter, linking the large pores, thus forming a highly porous network (FIG. 5).

The high porosity of the particle was confirmed by BET nitrogen adsorption which estimated the surface area of the particles to be in excess of 70 m$^2$ per gram as compared with 0.02 m$^2$ per gram for solid spheres of a similar size. However, the rate of diffusion of solvents in to the particles is very solvent dependent. Penetration of the solvent into the particles was observed using transmission microscopy; when solvent penetrated the particles, they appeared transparent, and when solvent was excluded, the particles were opaque. Solvents such as DMF, acetonitrile, and ethanol appeared to penetrate into the particles more quickly (less than 5 minutes), while water and acidic solutions appeared to penetrate more slowly (more than 1 hour).

We believe the large pores which are present in the particles are a result of the formation of water in the cross-linking process. The water that is formed within the emulsion droplets of silica is not miscible, and the water aggregates to form water droplets within the larger silica emulsion droplets (water-in-oil emulsion). When the particles are dried, the water evaporates leaving the pores. The slow diffusion of water into the pores can be explained by the hydrophobic nature of the propyl thiol chains, which would line the fine channels that link the large pores. The diffusion of water would be hindered in the hydrophobic channels, and the water penetrates into the particles slower. The less polar solvents, such as ethanol, acetonitrile, and DMF can pass through the channels with less hindrance.

Figure 6:
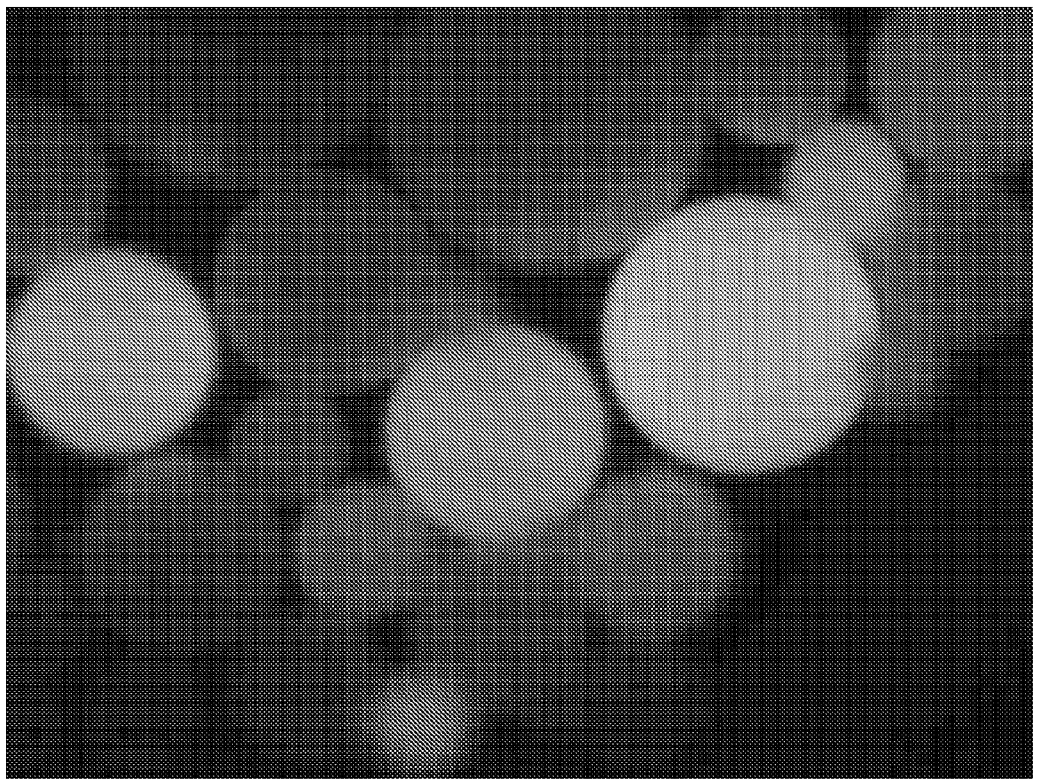
FIG. 6 is a fluorescence image that shows some of the optical diversity which can be achieved using only two fluorescent dyes. The dyes are linked covalently into the particles so no leaching of the dye can occur.

The porous nature of the particles explains how organic compounds (such as fluorescent dyes and DNA) can be incorporated into the particle post synthesis. Additionally, the thiol groups allow isothiocyanate and succinmdyl ester functionalized fluorescent dyes to be covalently incorporated into the particles to increase the optical diversity. The extent of this diversity can be seen in the flow cytometry and fluorescent microscopy data. Using two fluorescent dyes, it is possible to greatly alter the optical signature of the particles. The flow cytometry data clearly shows the difference between the orange and green functionalized particles, as well as particles which contain a combination of both green and orange dyes (FIG. 6).

Figure 7:
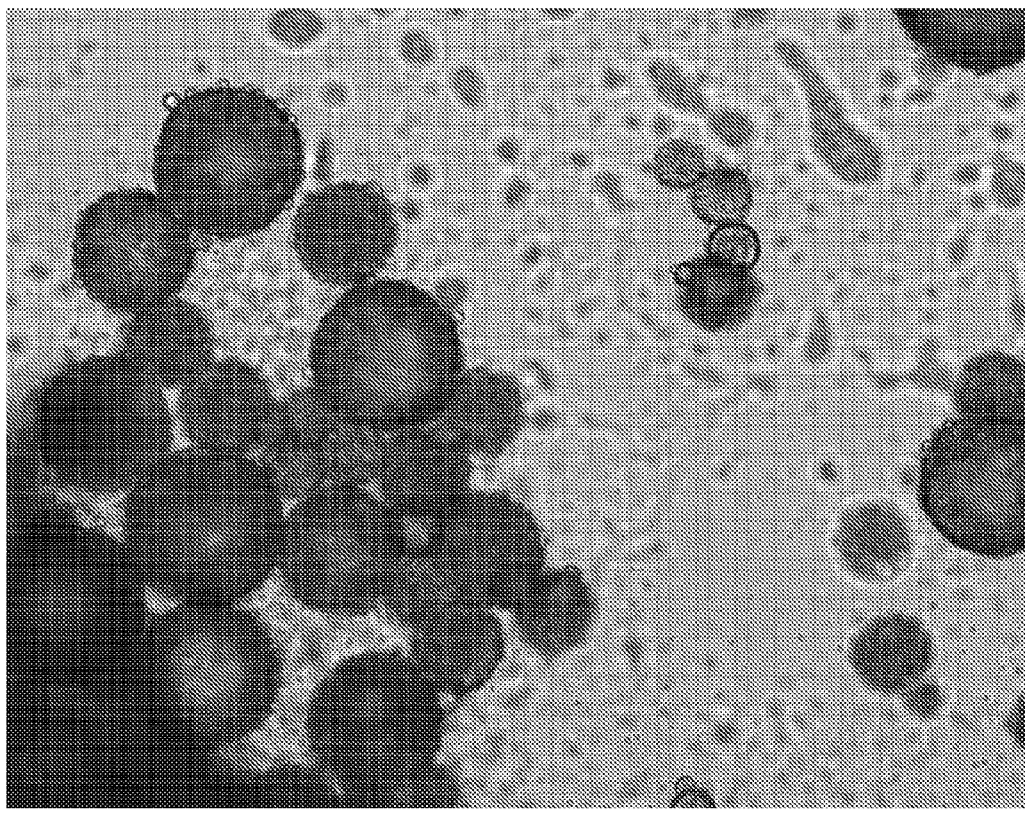
FIG. 7 is a photograph that confirms the attachment of a DNA linker to the surface of the particles. The red/brown coloration is due to trityl ions cleaved from the linker group
Figure 8A:
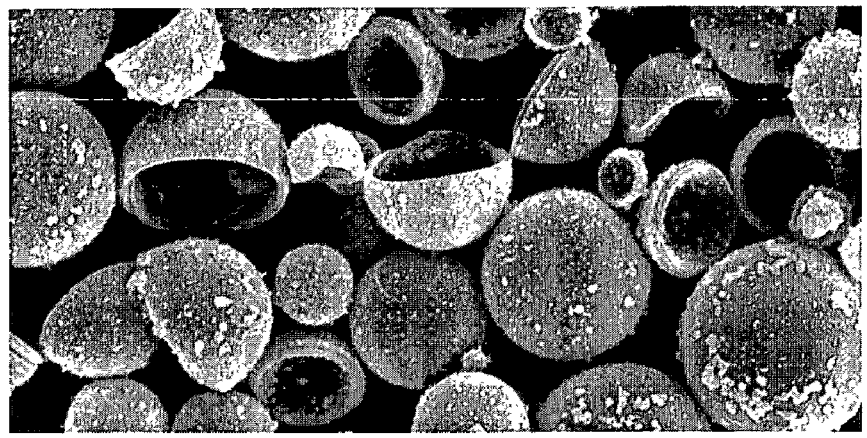
FIGS. 8A-8F are SEM images of particles produced using various concentrations of ammonia, A. 25%, B. 8%, C. 5%, D. 1%, E. 0.1%, and F. 8% ammonia plus 0.1% SDS.
Figure 8B:
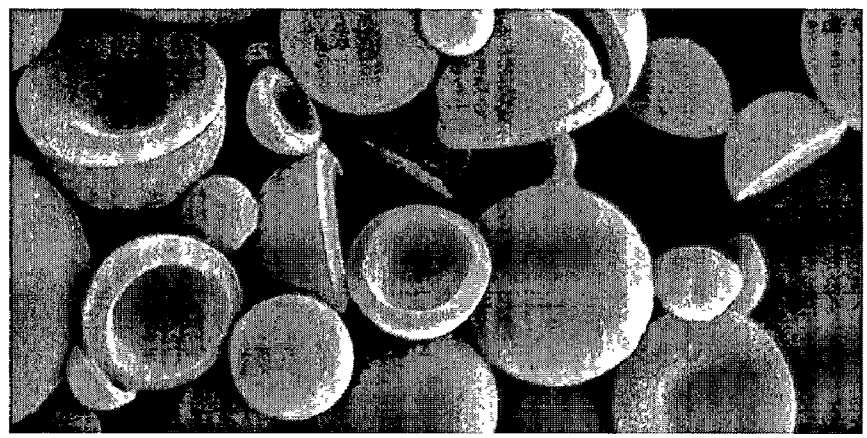
Figure 8C:
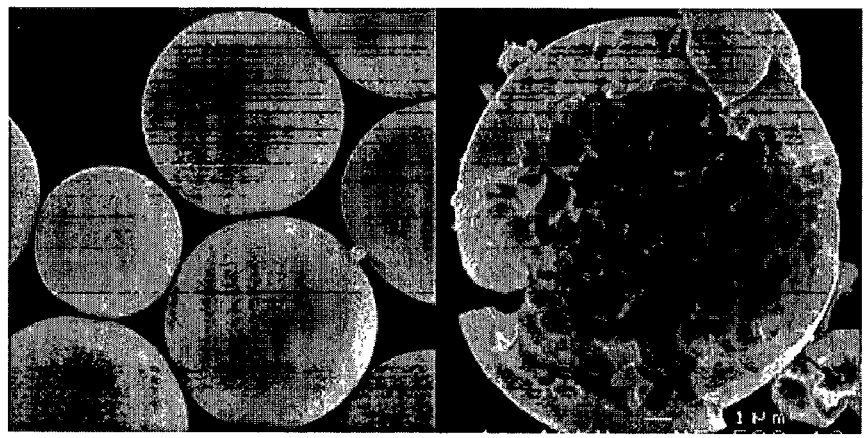
Figure 8D:
Figure 8E:
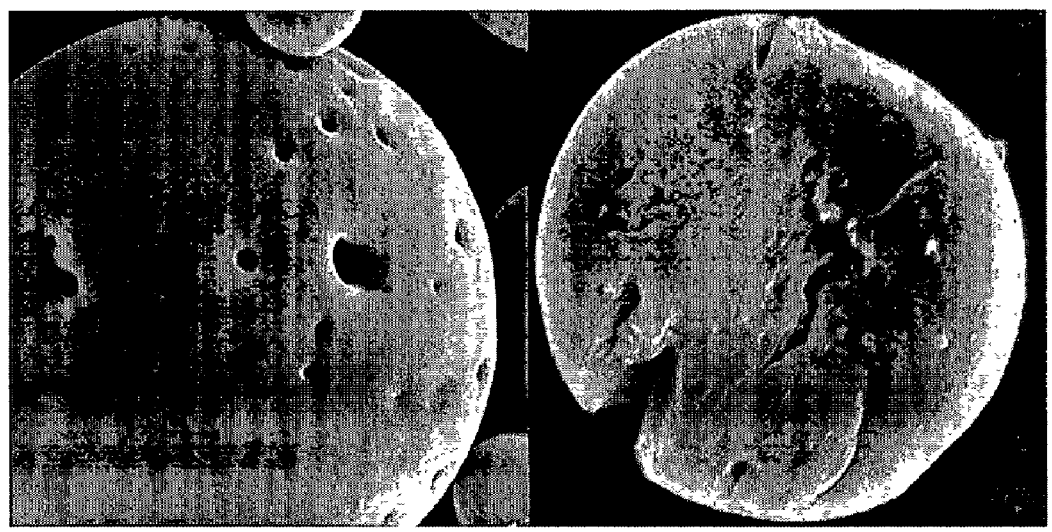
Figure 8F:
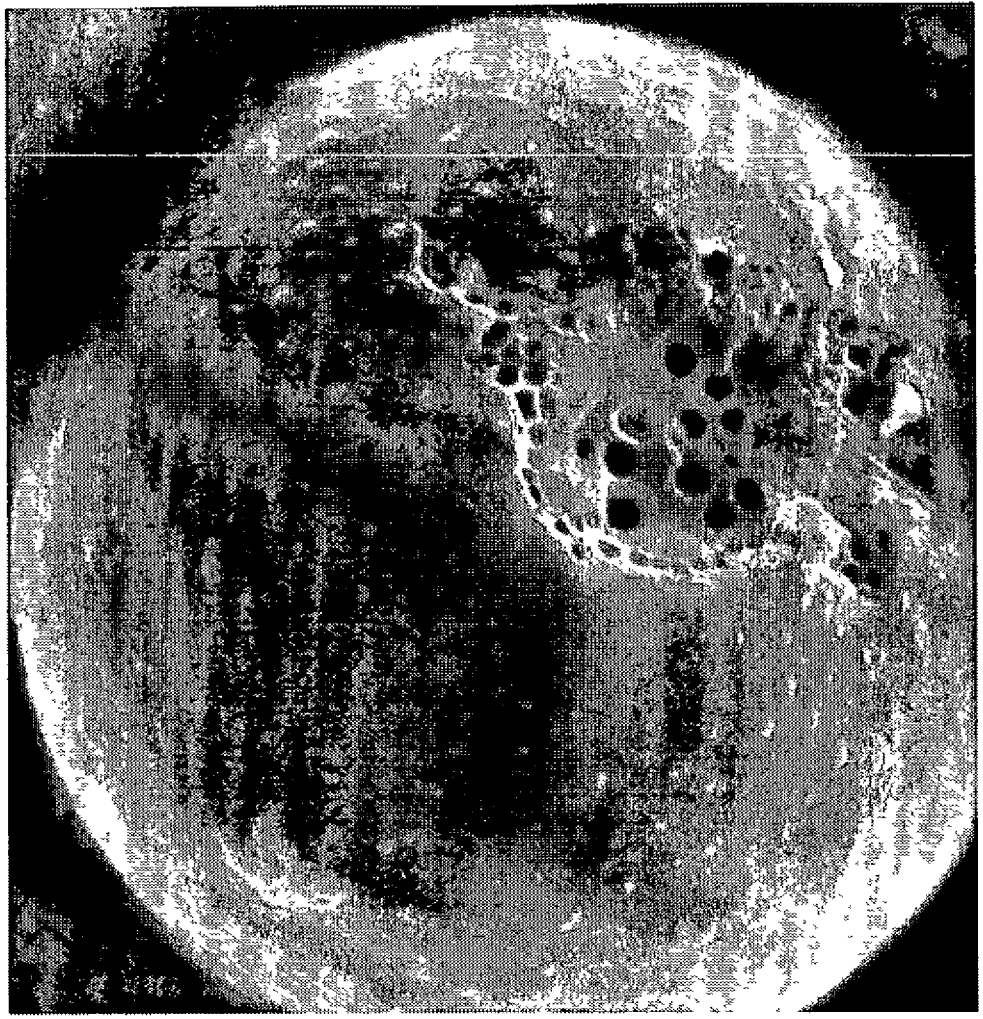

By using a thiol modified silane, potentially every Si unit can bind to an organic molecule. This feature allows the DNA to be reacted onto the surface of the particles through the use of an organic linker group. Oligonucleotide strands can be coupled to the particles using a succinic-acid modified base. The carboxylic acid group can be reacted with thiol groups to form a cleavable linker group. The 5' hydroxyl group on the base is protected with a DMT group. When cleaved with acid, the DMT ion exhibits a strong absorption maximum at 498 nm. This provides a convenient test for determining whether the linker group has been successfully coupled to the surface of the particle. FIG. 7 clearly indicates the linker group has been successfully attached to the particles. The distinct red/brown coloration of the particles is caused by the DMT ions produced.

An oligonucleotide sequence 4 bases long (5'-TGAT-3') was grown on the particles and again the successful growth of the oligonucleotide strands on the surface of the particle was confirmed by liberation of the DMT ion. The coupling efficiency of DNA to the particles was determined to be 1200 nmoles per gram of support. Currently, we are investigating linker groups, which are non-cleavable, which will allow us to test the hybridization of complementary DNA sequences to the particles.

With careful selection of the reaction conditions, it is possible to couple one type of molecule selectively onto the surface of the particle and using different reaction conditions and to incorporate other types of molecules inside the porous network. For example, by manipulating the solvating conditions, it is possible to selectively couple DNA onto the surface of the particles, and to incorporate fluorescent molecules inside the porous particle.

This example illustrates that a new class of organosilica particles according to the invention have potential applications as solid supports for use in rapid DNA sequencing. The particles that have been developed are unique because they are both highly porous and highly functionalized, which means that large amounts organic compounds can be reacted onto the particles post synthesis.

These experiments were carried out by the following procedures.

Particle Synthesis

110 μl of 35% HCl was placed in 10 ml of H$_2$O to form a 0.1 M solution. 800 μl of this solution was added to 80 ml of water with 10 ml of MPS (3-mercaptopropyl trimethoxysilane. The solution was stirred at 2000 rpm for 2 days. 750 μl of 25% NH$_3$ solution was added to 100 ml of H$_2$O and the 2 day old MPS solution was slowly added (experiment conducted while NH$_3$ solution was stirred and when quiescent). Immediately thereafter, the MPS reaction vessel was rinsed with ~75 ml of ethanol, which was added to the ammonia-MPS solution. After the addition of the ethanol the mixture was filtered in a buchner funnel under vacuum using Whatman type 13 filter paper. The particles collected were rinsed with ethanol, collected from the filter, and then resuspended in 3 ml of ethanol.

Linker Coupling 10 mg of particles were added to a solution of acetonitrile (200 μl) containing 1 mg of DMT-T-L and 2 μl of DIC. The solution was stirred, and the mixture was allowed to react for an hour. The particles were allowed to settle, and the solution was removed. The particles were then washed five times with acetonitrile.

To determine that coupling had occurred, a small sample of particles was treated with a 1:1 solution of perchloric acid/methanol, to liberate the DMT ion.

DNA Coupling

The particles with linker groups attached were transferred into a dry acetonitrile solution, and loaded into an automated DNA synthesizer. A four base sequence was grown on the surface (5'-TGAT-3'). 1.5 mg of particles were transferred into 3 ml of 1:1 methanol/perchloric acid solution and the absorption at 498 nm was determined.

3 mg of particles were placed in 3 ml of 25% ammonia solution to cleave the oligonucleotide strands, and the absorption at 260 nm was determined.

Dye Coupling

Fluorescent dyes were incorporated into the particles by simply placing the particles into a solution isothiocyanate modified dye and allowing the dye to diffuse into the particles and react with the thiol groups present.

EXAMPLE 12

The morphology of the particles can be controlled by altering the concentration of the cross-linking catalyst, altering the reaction time of the acid catalysed steps, changing the functionality of the cross-linking catalyst and by adding other chemicals such as surfactants, polyelectrolytes and ionic compounds.

Greatest control over particle morphology can be achieved by altering the concentration of catalyst and is summarized in Table 4. Particles were synthesised as outlined above with varying $NH_3$ concentration (FIGS. 8A-8F).

TABLE 4

Morphology Control by Catalyst Concentration

| $NH_3$ Concentration | Surface Morphology | Particle Morphology | Silica Morphology* |
|---|---|---|---|
| 25% | Rough | Hollow | Glass like |
| 8% | Smooth | Hollow | Glass like |
| 5% | Smooth | Porous Network | Glass like |
| 1% | Smooth | Porous Network | Glass/rubber |
| 0.1% | Smooth with holes | Porous Network | Rubber like |
| 8% + 0.1% SDS | Rough | Porous Network | Glass like |

*Glass like particles fracture when a large enough force is applied, rubber like particles deform and do not fracture.

Control of Morphology Through Acid Catalysis Reaction Time.

Figure 9:
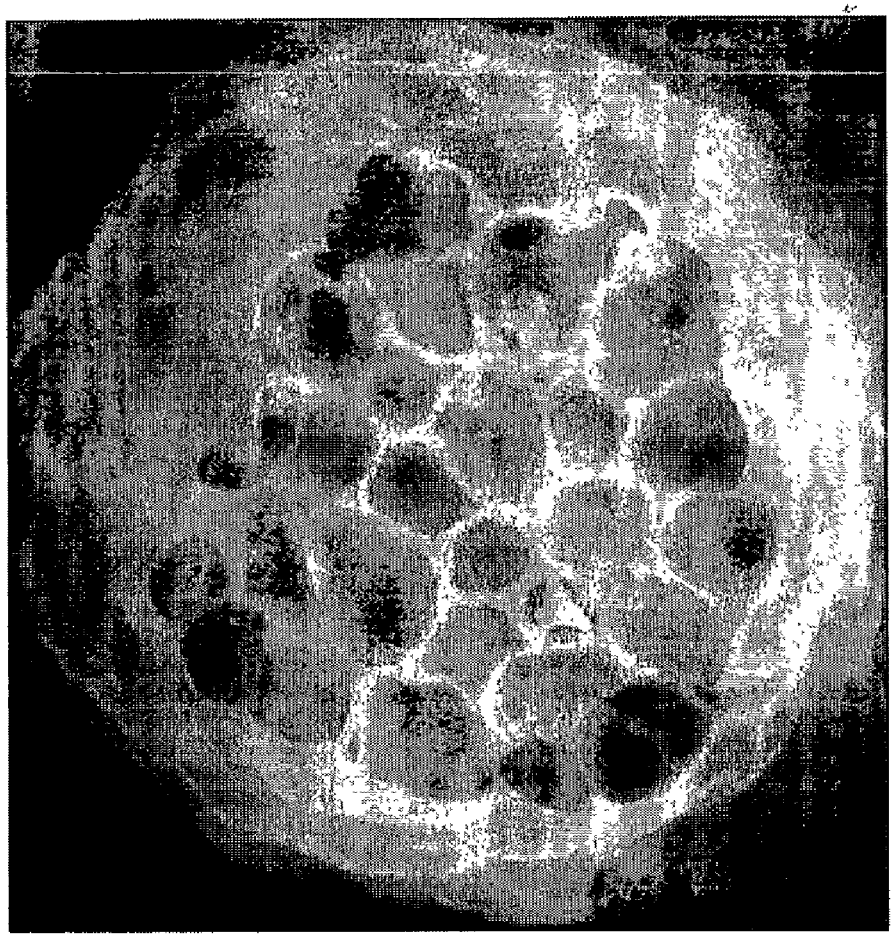
FIG. 9 is an SEM image of a particle produced using 25% ammonia and aging the emulsion for 48 hours.

The above samples were prepared with an emulsion that was aged for 24 hours. By increasing the aging time to 48 hours particles with a thinner shell and larger internal pores can be synthesized (FIG. 9).

Control of Morphology Through Choice of Catalyst

Figure 10A:
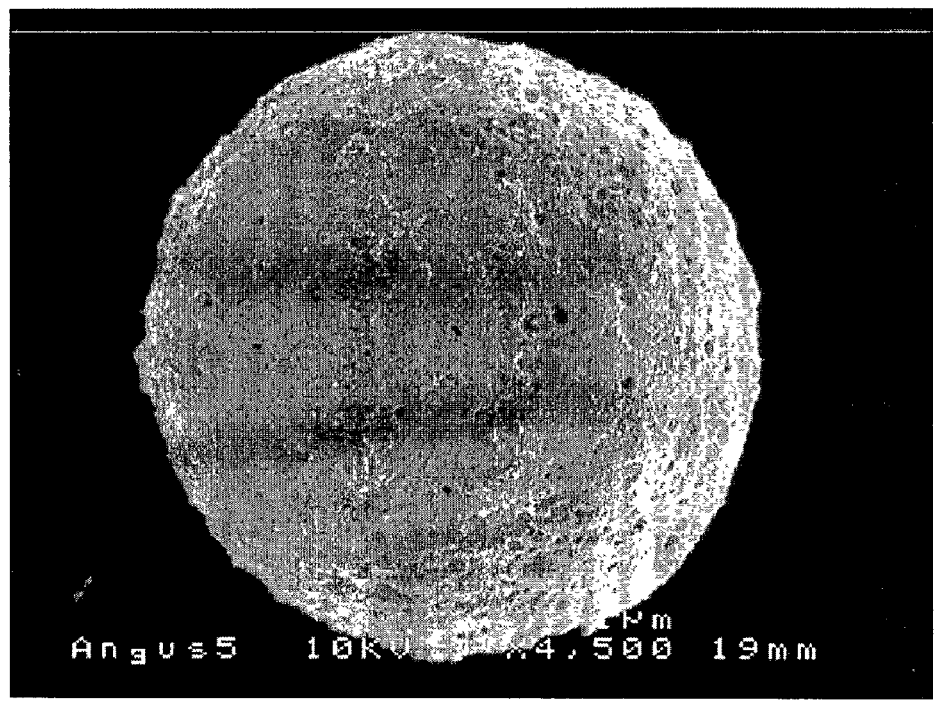
FIGS. 10A and 10B are SEM images at different magnifications of particles produced using methylamine as the catalyst.
Figure 10B:
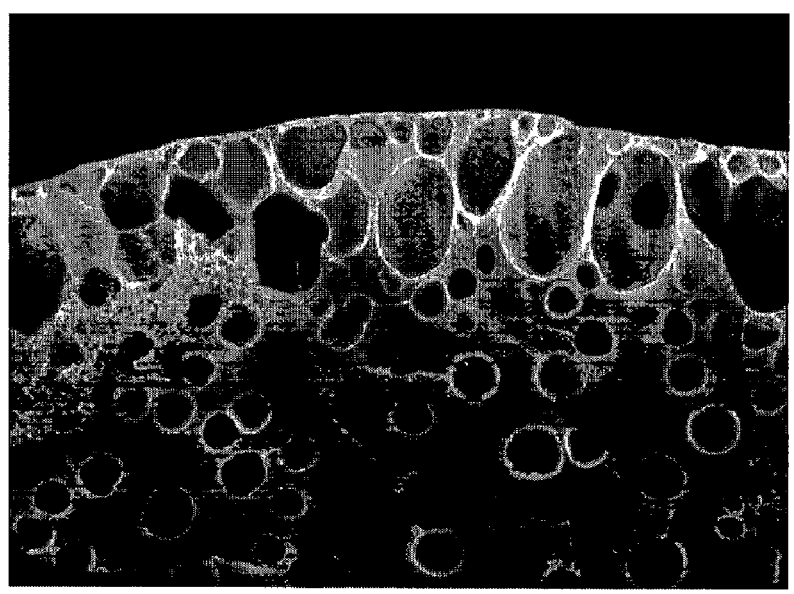

Significant changes in the particles morphology can be achieved by altering the cross-linking catalysted used. By using methylamine ($CH_3NH_2$) instead of ammonia as the catalyst, the morphology of the particles was quite different (FIGS. 10A and 10B). The particles formed using methylamine have highly porous surfaces with distinct holes covering the surface. They also have swollen pores under the surface of the particles. The reason for the difference in the morphology of the particles is that methylamine quickly reacts with the surface of the emlusion droplet to form a rubbery membrane around the surface of the droplet. As the cross-linking continues inside the particle the density difference between the silane monomer and the condensed silica with water causes the particle to swell, which leads to ballooning of the particles forming the highly porous surface described above.

Other Morphological Control

Figures 11A, 11B:
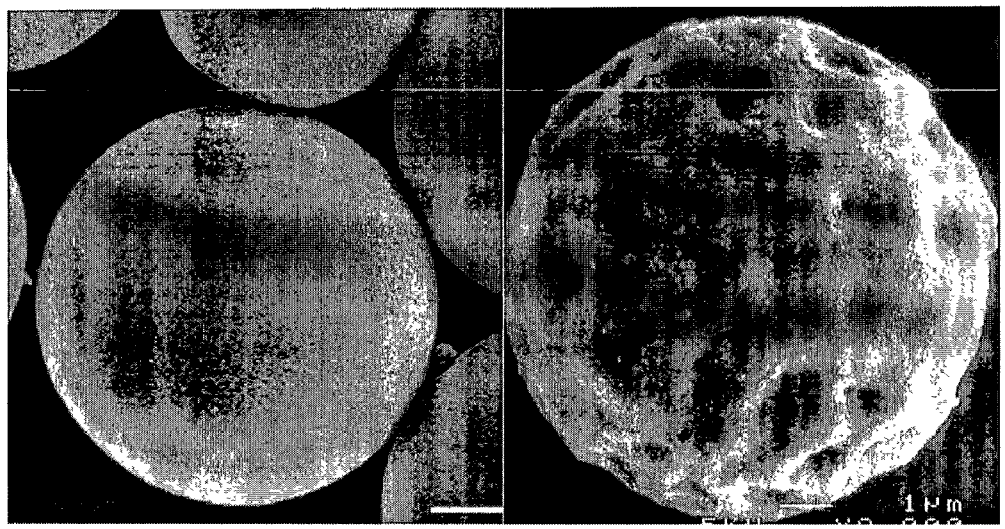
FIGS. 11A and 11B are SEM images at different magnifications of particles before (11A) and after (11B) treatment with NaOH.

Particles can have some of their surface dissolved away by NaOH to create variation in the surface morphology (FIG. 11). This feature is especially useful if a particular type of particle has very small surface channels, or if the surface groups on a particle have been oxidized. 0.1 g of NaOH was added to 8 ml of water. 400 µl of this solution was added to 10 mg of beads and allowed to react for 1-5 min depending on the amount of surface to be removed. The particles were then spun down at 1500 g and the supernatant removed. 500 µl of water was added to the particles and then shaken well. 1 ml of ethanol was then added to allow for easier centrifugation of the particles. The particles were subsequently centrifuged and washed in ethanol 3 times.

EXAMPLE 13

Figure 12:
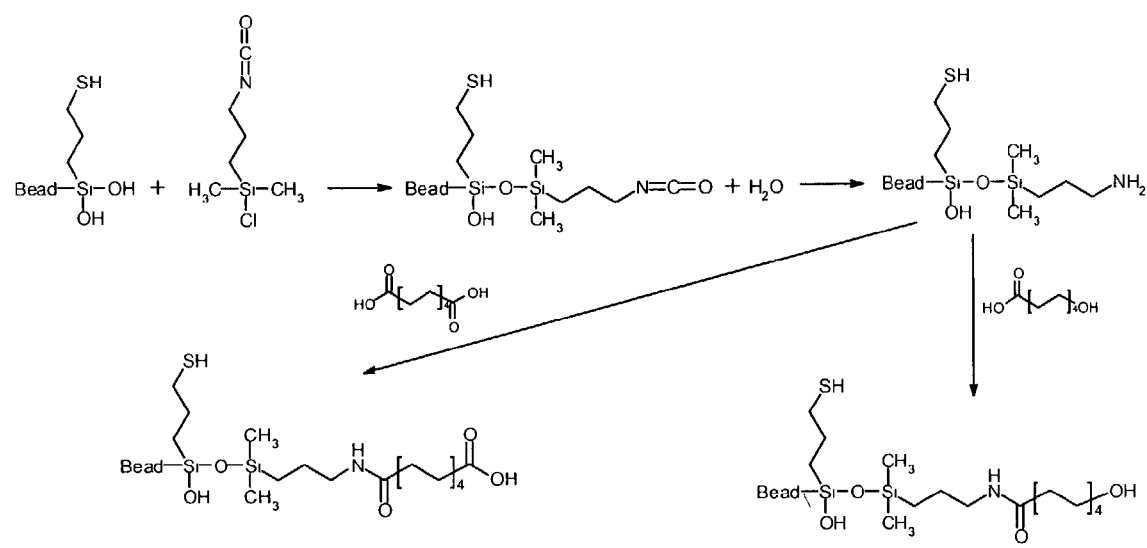
FIG. 12 is a schematic illustration for modifying the surface functionality of a particle of the invention.

The surface functionality of the particles may be modified to give different surface groups, depending on the use of the particles. For peptide work, a terminal amino group is preferable, for direct DNA synthesis a terminal hydroxyl group is preferable and for coupling presynthesized DNA, a terminal carboxylic acid group is preferable (FIG. 12).

Particles made by the procedures described above were washed 4 times in dry hexane to remove any traces of water or ethanol. Then 400 µl of 3-isocyanatodimethylchlorosilane was added to the particles and allowed to react for 1 hour. The particles were then washed twice in hexane, and then 400 µl of 0.1 M HCl was added. The solution was shaken and allowed to stand for 1 hour. 1 ml of THF was added to the solution, and the particles were then washed a further 3 times in THF.

To introduce a carboxylic acid moiety on the surface, dodecanedioic acid was reacted with the surface of the isocyanate functionalized particles by adding 50 mg of the dodecanedioic acid to 1 ml of THF. This solution was contacted with the particles, and then 50 µl diisopropylcarbodiimide (DIC) was added. The reaction was allowed to proceed for 3 hours, and the particles were then washed 4 times in THF and then 4 times in a 0.01% TRITON X 100 surfactant solution.

To introduce a hydroxyl group on the surface of the particles, 10-hydroxydecanoic acid was used in place of the dodecanedioic acid in the above-described procedure.

The linker chemistry also functions as a spacer group to increase the separation of any attached molecules, e.g., DNA or peptide, from the particle to reduce the effect of the particle on binding interactions between attached molecules and molecules not attached to the same particle, e.g., hybridization. Although this example employs dodecanedioic acid and 10-hydroxydecanoic acid, other compounds with longer or shorter carbon, or other chemical functionality, e.g., siloxane, chains could be used to increase or decrease the separation of the DNA from the particle depending on the application. In addition, chains that are sterically hindered, e.g., those that contain multiple carbon bonds, may also be used to control the orientation of molecules relative to the surface.

To couple presynthesized DNA to the particles, a standard coupling procedure of amine modified DNA to carboxylic acid particles was used. A 100 µl aliquot of particles was washed 3 times in pH 5 MES buffer with 0.01% TRITON X 100 and 70 µl of 25 µM amine DNA solution was added and allowed to stand for 30 min. 30 µl of 100 mg/ml solution of fresh, cold 1-Ethyl-3-(3-dimethylaminopropyl)-carbodiimide (EDC) solution was added to the reaction mixture and allowed to react for 90 min in the refrigerator. The DNA coupled particles were then washed 3 times with the pH 5 MES buffer with 0.01% TRITON X 100.

Using the standard phosphoramidite chemistry of automated DNA synthesizers, like the Beckman-Coulter Oligo-1000M, oligonucleotide sequences can be directly grown onto the particles that have a primary hydroxy group on their surface.

Figure 13A:
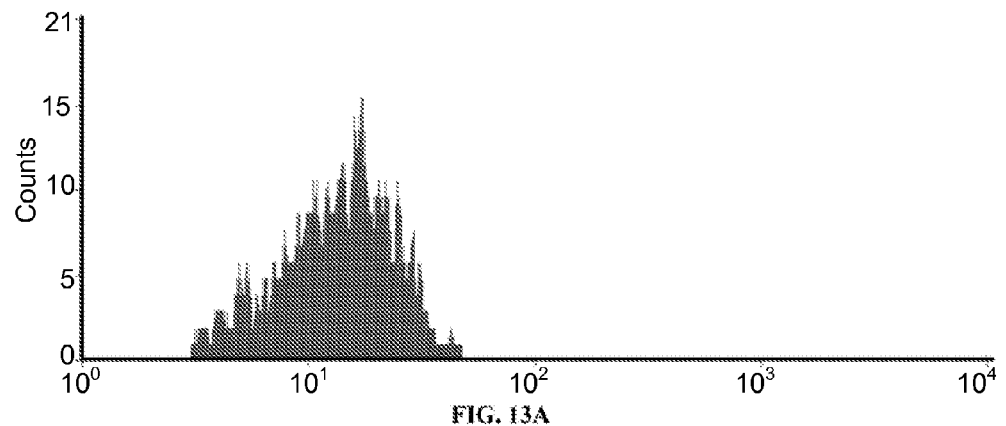
FIGS. 13A and 13B are histograms of fluorescence intensity of mismatched (13A) and complementary (13B) DNA binding to particles functionalized with a sequence of DNA.
Figure 13B:
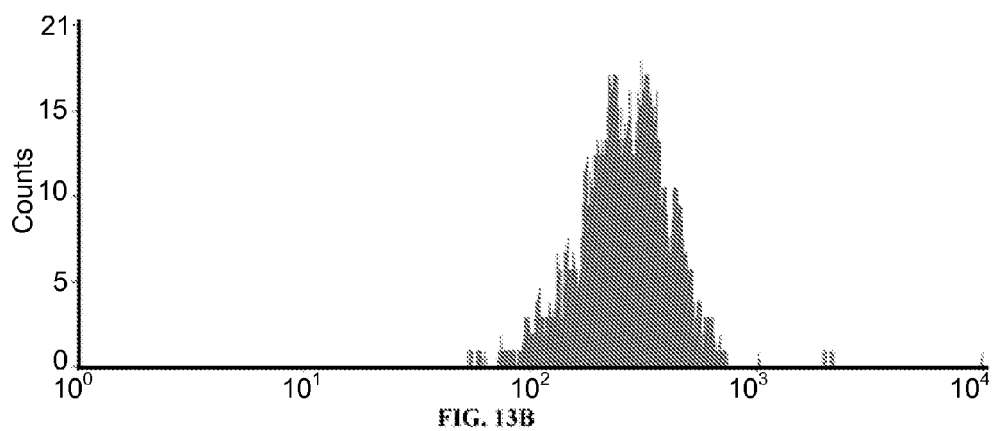
Figure 14A:
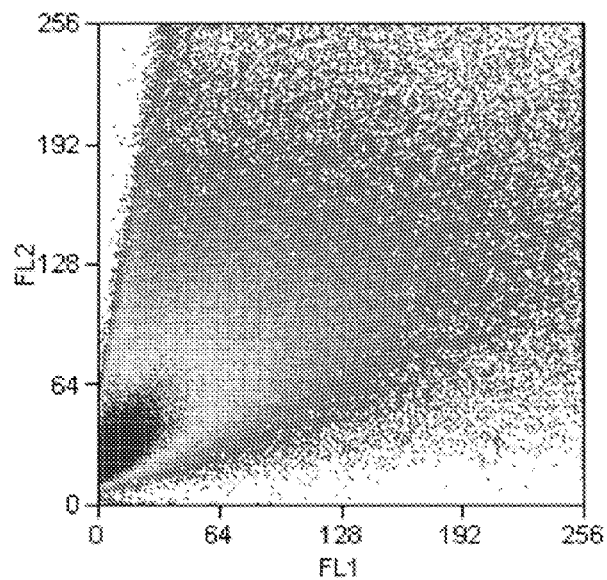
FIG. 14A is data from 2D flow cytometry showing optical diversity in 2 parameters.
Figure 14B:
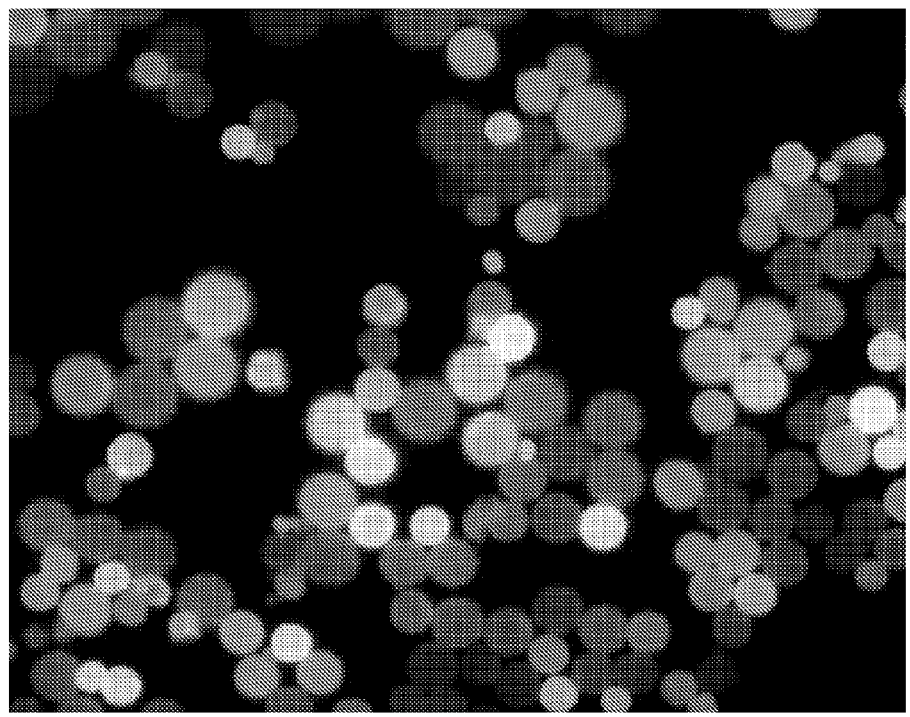
FIG. 14B is a photograph illustrating the optical diversity possible with the particles of the invention.

DNA hybridization of complementary (5' TACAGGCCT-CACGTTACCTG, SEQ ID NO: 1) and mismatched (5'CAG-GTAACGTGAGGCCTGTT, SEQ ID NO: 2) sequences was performed by hybridizing the particles containing these sequences with fluorescently labeled target sequences (5'CAGGTAACGTGAGGCCTGTT, SEQ ID NO: 2) in pH 8 MES with a 100 nM concentration of fluorescent probe (FIGS. 13A and 13B). These data clearly show that the complementary sequence (average fluorescence intensity of 287 A.U.) can be discriminated from the non-complementary mismatched sequence (average fluorescence intensity of 16 A.U.).

EXAMPLE 14

Highly optically diverse particles were prepared by incorporating fluorescent dyes into the particles combinatorially. In this particular example, the dyes ALEXFLUOR 350 succinimidyl ester, Rhodamine B isothiocyanate and BODIPY 630 succinimidyl ester were used, but any fluorescent dye reactive to thiol or amine groups could be used. This method of making labeled particles combinatorially is not possible when using particles such as polystyrene beads into which dyes are loaded via swelling in an organic solvent.

10 mg of particles, synthesized as described above, were washed in 500 µl of ethanol and then separated into 5 different reaction mixtures. 50 µl of ALEXFLUOR A350 dye dissolved in ethanol with varying concentrations (0 nM, 1 nM, 2 nM, 3 nM, 4 nM) was added to the reaction mixtures, and the dye was allowed to couple to the particles for 45 min. 500 µl of ethanol was added to the reaction mixtures, and the samples were centrifuged for 15 sec at 2000 g, and the supernatant removed. The particles were then combined into one reaction mixture and washed 3 times in ethanol. The process was then repeated (split into 5 reaction mixtures and dye of 0 nM, 1 nM, 2 nM, 3 nM, 4 nM added) using the Rhodamine B ITC and BODIPY dyes. The particles formed can then have their surface modified for DNA coupling as outlined above.

EXAMPLE 15

Increasingly, combinatorial chemistry is being used to synthesize large DNA libraries. However, the challenge, as in all combinatorial chemistry, is keeping track of the multitude of compounds that are synthesized. A number of methods have been proposed for tracking the compounds synthesized, including chemical and magnetic tagging, however, attaching and reading these tags involves many extra chemical and analytical steps. Additionally, the necessity for compatible compound and tag synthesis reactions places substantial limitations on the procedure. An alternative method of tracking the compounds is to synthesize the compounds/sequences on supports that have unique optical properties. Each particle's unique optical signature corresponds directly to the compound synthesized on the support. Using combinations of fluorescent dyes incorporated into the solid supports, a flow cytometer can be used to distinguish the different supports and thus distinguish the different sequences. Clearly, this method requires a great number of optically diverse particles for it to be effective.

A method commonly employed for synthesizing uniform particles for flow cytometry is to use polystyrene particles. These particles are swollen in a solvent to enable dye to be absorbed. When the desired amount of dye has been incorporated, the particles are shrunk to their original size, thereby locking the absorbed dye into the particles. The disadvantage of this method is that the particles are only stable in a limited number of solvents. In solvents such as acetonitrile, the particles swell, and dye leaches from the particles. This catastrophically alters the optical properties of the particles, and any encoded information would no longer be identifiable.

To overcome the leaching of the dye, silica can be used in the support particles. Through a modification of the Stober process, silane coupling agents, such as aminopropyl trimethoxysilane (APS), can be reacted with functionalized fluorescent dyes and then be covalently incorporated into the silica network of the particles. Shells of different fluorescent material can be grown onto the particles to increase the optical diversity, however the fluorescent dyes must be incorporated into the particle during the shell synthesis. Ideally, it would be preferable use a combination of both techniques—flexible incorporation of dyes into the particle post synthesis as well as covalent linking of the dye to particles that have consistent optical properties. This limits leaching of the dye, resulting in loss of encoded information. For this to be possible, the silica particles must be both highly porous, to allow the fluorescent dyes to be incorporated throughout the particle and also highly functionalized, to covalently attach the dyes to the particle.

We present in this example the formation mechanism of highly functionalized organosilica particles, which are formed with a series of fine channels and large pores, to make the particles highly porous. The particles have been made highly functionalized by using 3-mercaptopropyl trimethoxysilane (MPS) as the monomer instead of tetraethylorthosilicate (TEOS). By using MPS as the monomer, potentially every Si unit can be coupled to fluorophore or organic analyte.

The method for preparing the support particles involves a two step process which initially involves acid catalyzed hydrolysis to activate the monomer, followed by base catalyzed cross-linking which forms stable particles as follows.

Under acidic conditions MPS monomer quickly hydrolyzes to form solubilizing silanol groups. This was observed by following the reaction visually over the first two hours. Initially, the MPS monomer was insoluble in the acidic solution, and when the solution was stirred, an emulsion was formed. Over a period of around two hours, the emulsion gradually broke down to give a clear solution. This change can be attributed to the hydrolysis of the monomer, forming the more soluble silica species.

Figure 15:
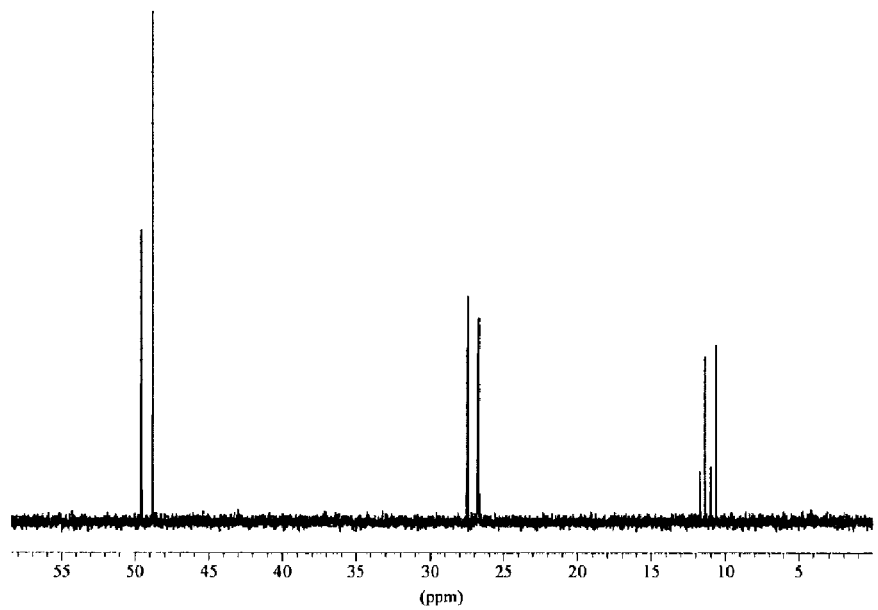
FIG. 15 is a graph of $^{13}$C NMR of MPS after 2 hours of acid catalyzed hydrolysis. The NMR peaks to the right correspond to the reaction mixture, and the NMR peaks to the left are the same sample with 20 µl of methanol added.

This process was confirmed using $^{13}$C NMR (FIG. 15). After 2 hours, three peaks were present in the spectrum. Two peaks at 14 and 28 ppm were due to the carbon in the propyl chain, and a third peak at 49 ppm was due to methanol. The peak at 49 ppm was confirmed to be due to methanol by adding 10 µl of methanol to the NMR tube and re-running the spectrum. The resulting spectrum was identical to the previous sample, except the intensity of the peak at 49 ppm increased in intensity. A peak due to a methoxy carbon (not observed) would have an expected chemical shift of around 40 ppm.

Figure 16:
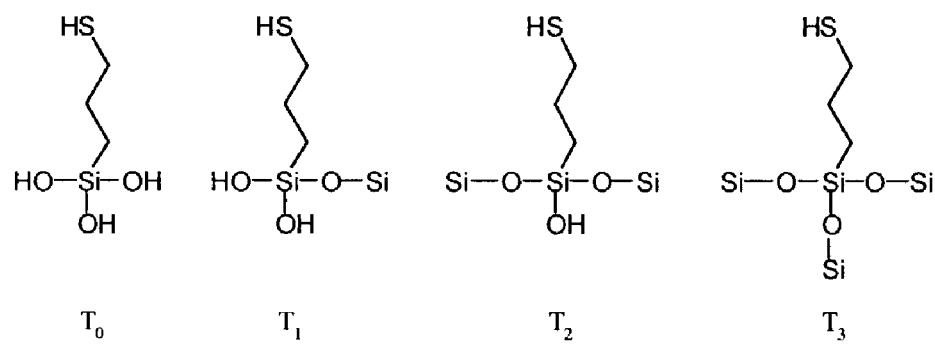
FIG. 16 is a schematic illustration of the four different silane centers that may be observed in $^{29}$Si NMR. The nomenclature of the peaks has been standardized using a T to denote that there are three potential sites on the silane, which could condense, and a subscript number indicating the number of times the silane center has condensed.
Figure 17:
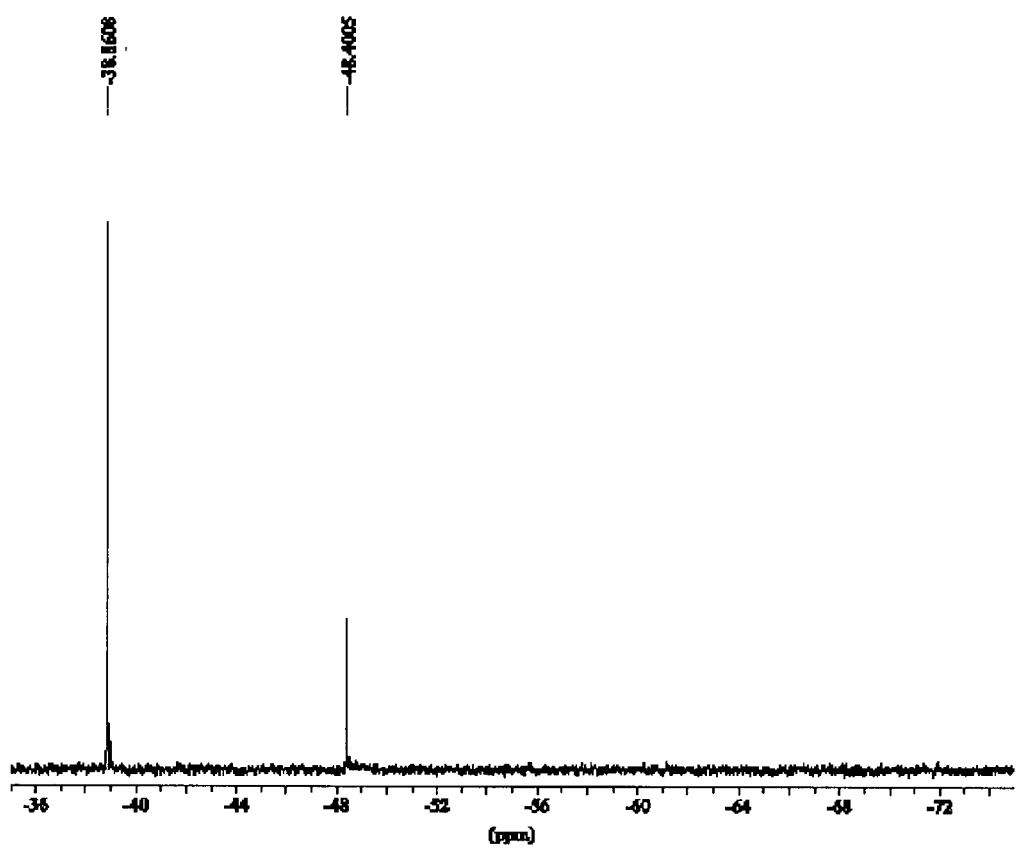
FIG. 17 is a graph of $^{29}$Si NMR data of MPS after 2 hours of acid hydrolysis.

No significant condensation of the monomer occurs after 2 hours, because of the very slow condensation rate of the monomer. The $^{29}$Si NMR (FIGS. 16 and 17) of a sample that was treated with acid for 2 hours shows the presence of just the monomer ($T_0$) and dimer ($T_1$).

The condensation of the monomer is very slow, because the pH of the aqueous solution is close to the isoelectric point of the monomer. The isoelectric point of hydrolysed TEOS (silicic acid) has been measured to be around 2, but because MPS has an electron donating alky chain present, the isoelectric point of MPS would be higher, estimated to be around pH 3. The condensation of TEOS between pH 2 and pH 7 is proposed to occur by the reaction between a deprotonated silanol and a fully protonated silicic acid monomer.

At the isoelectric point, the condensation rate is at a minimum because by definition, none of the silica species present has a charge. Below the isoelectric point, the condensation reaction increases because of the protonation of the silanol group, which can react with an unprotonated silanol. It is reasonable to assume that MPS would follow a similar reaction pathway explaining why the rate of polymerization is so slow in the conditions of this reaction.

As the reaction proceeds the solution gradually becomes cloudy, with an emulsion once again being formed. The emulsion is due to the presence of short polymer chains, which are formed from the slow polymerization of the monomer. These short polymer chains are not soluble in the aqueous solution, but are liquid, so can form an emulsion.

Figure 18:
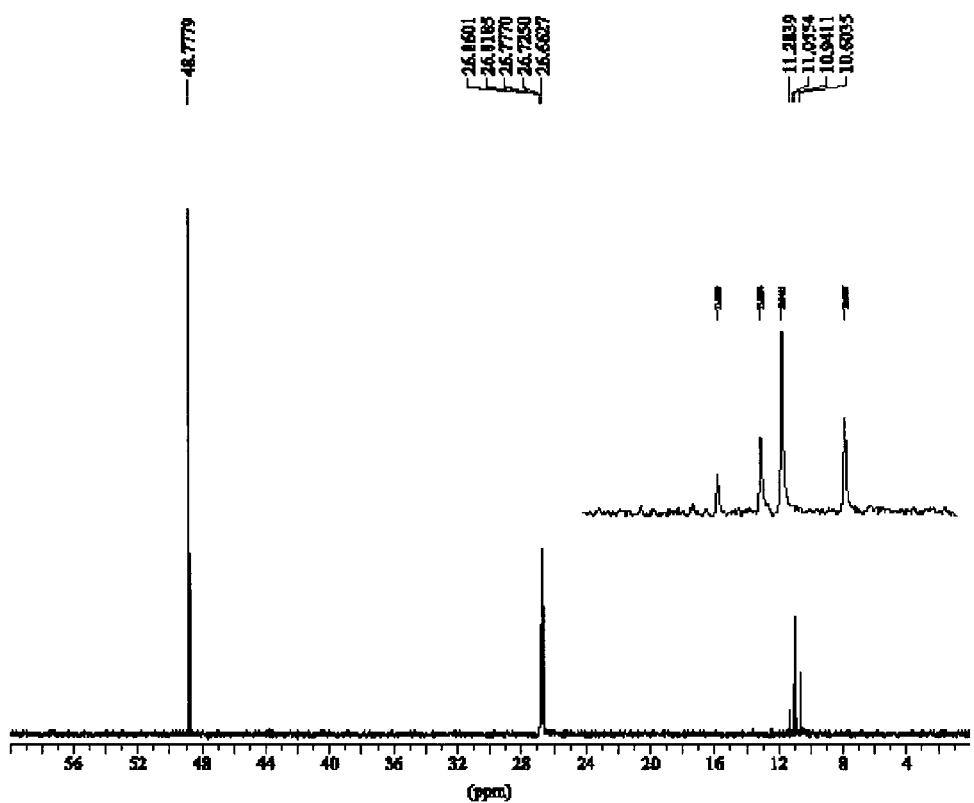
FIG. 18 is a graph of $^{13}$C NMR data of MPS after 30 hours in acidic conditions.

The presence of short polymer chains can be seen in the $^{29}$Si and $^{13}$C NMR after 24 hours. In the $^{13}$C NMR (FIG. 18), a peak at 28 ppm was due to the carbon α to the silicon atom. The chemical shift of this peak was dependent on the chemical environment of the silica. When the silica was more condensed, the electron withdrawing O-Si groups on the silica caused the carbon peak to be shifted to a higher field.

Figure 19:
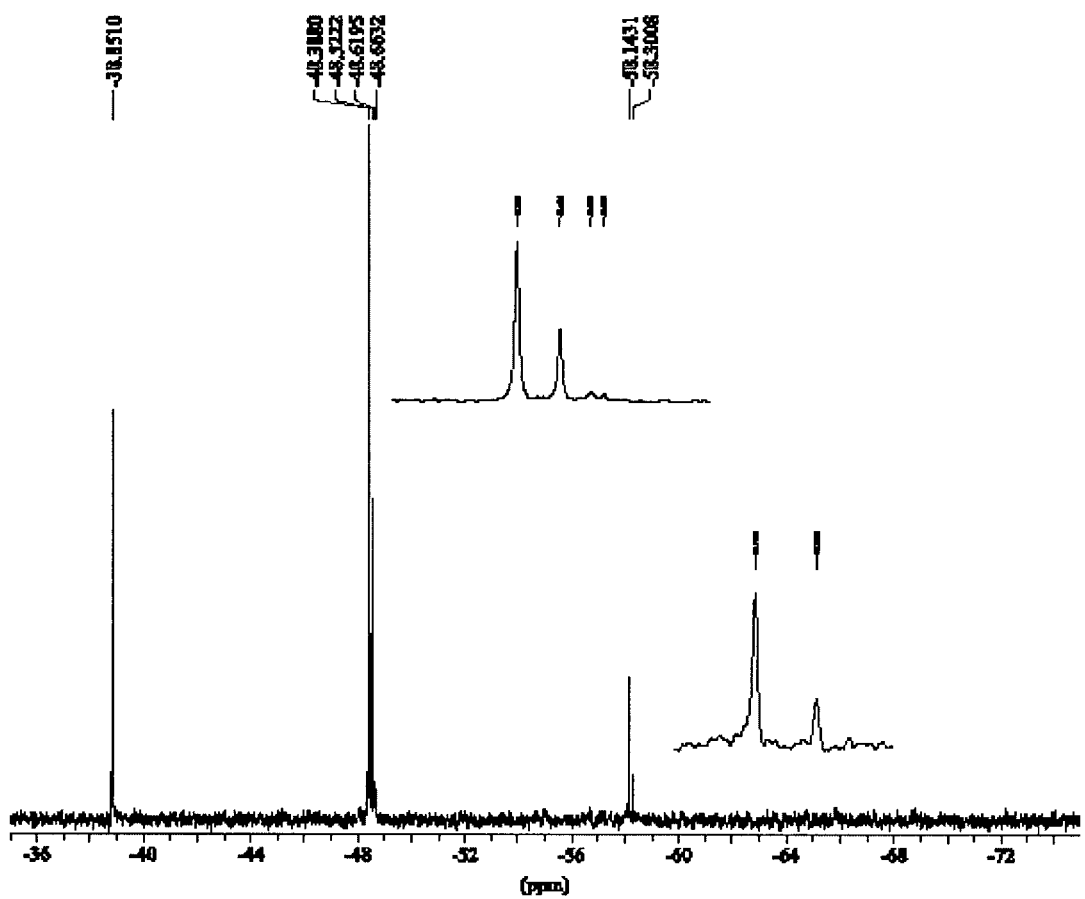
FIG. 19 is a graph of $^{29}$Si NMR data of MPS after 30 hours in acidic conditions.

A better determination of the degree of condensation can be obtained from the $^{29}$Si NMR (FIG. 19). The $^{29}$Si NMR gave a clear separation of the silica species present, with the chemical shift of the silane shifted by 10 ppm to a higher field, with each subsequent condensation reaction. The NMR after 24 hours clearly showed a decrease in monomer concentration and a marked increase in the $T_1$ and $T_2$ concentration. For each type of condensed silica ($T_1$, $T_2$ and $T_3$), small changes in chemical shift can be used to determine the length of the polymer chains present. The longer the polymer chain, the more electron withdrawing groups present, and thus the chemical shift of the silane was lower.

In the 24 hour $^{29}$Si NMR sample, there were four $T_1$ peaks present. A peak at lowest field (−44.39 ppm) was due to a simple dimer, whereas a peak at −48.52 ppm was due to a trimer. This assignment was confirmed by comparing the integrated area with the $T_2$ peak at lowest field (−58.15 ppm), which corresponded to half the area of the $T_1$ peak (2:1 ratio of $T_1$:$T_2$ in a trimer). The other $T_1$ and $T_2$ peaks were due to longer polymer chains (possibly 4 and 5 monomer units in length).

If the solution were allowed to react for, more than three days, a white 'sludge'0 was formed at the bottom of the reaction vessel. This sludge was due to longer polymer chains, which could not form stable emulsion droplets and which aggregated at the bottom of the reaction mixture.

Stable particles were formed by adding a cross-linking catalyst (ammonia, or another water soluble amine) to the emulsion. When the catalyst was added, dark spots appear within the emulsion droplets, and these dark spots were swirled around until the cross-linking process was complete.

When the cross-linker in the aqueous solution reached the surface of the droplet, it started to catalyze the cross-linking between the short polymer chains at the surface of the droplet. A product of the cross-linking reaction was water, which was not soluble within the emulsion droplet. The water produced from the condensation reaction coalesced to form fine droplets of water within the emulsion droplets. The water droplets were swirled around because as the short polymers at the surface of the silica droplets condensed, short polymers from the center of the particle migrated to the surface, to combat the concentration gradient that was formed. Strong evidence to suggest that the dark spots formed in the process were water droplets could be seen with the coalescing of two small water drops to form a large drop.

The longer the reaction was hydrolyzed in acid, the slower the water droplets were swirled around inside the emulsion. This observation was consistent with the formation process proposed. The polymer chains present in the older droplets would be longer, and therefore more viscous. Consequently, when the concentration gradient was formed, it was harder for the polymer chains to migrate to the surface, and thus the water droplets moved more slowly. The viscosity may reach a point, as in the 3 day sample, where the emulsion droplet is so viscous, that the water droplets formed are not swirled around at all. In these samples, the cross-linker diffused through the particle, cross-linking the particle from the outside inwards.

Figure 20:
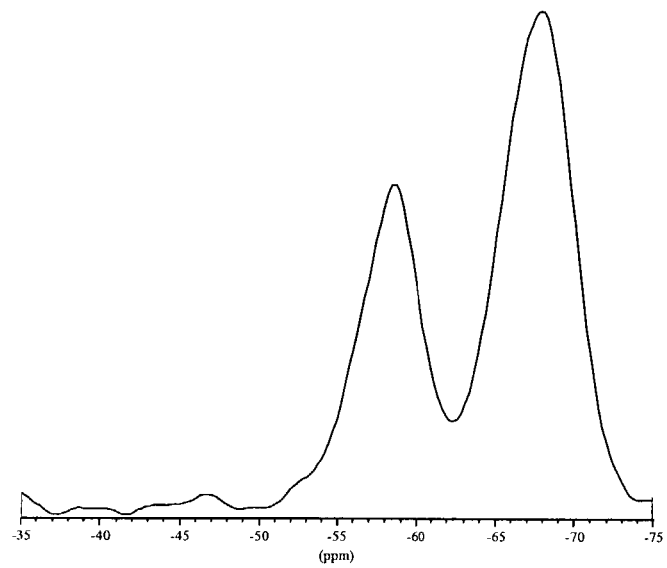
FIG. 20 is a graph of solid-state $^{29}$Si NMR data of the particles formed after cross-linking with ammonia.

Solid state $^{29}$Si NMR (FIG. 20) confirmed the emulsion droplets had been condensed to form highly cross-linked particles. The resolution of solid state NMR was much poorer than the solution NMR, and the detail within the peaks was lost. The distinction between the $T_1$, $T_2$ and $T_3$ silica peaks was still clearly apparent. As expected in the solid sample, no significant peak due to the monomer ($T_0$) was observed, and only a small peak due to the least condensed ($T_1$) silica was present (−47 ppm). The most significant peak in the spectrum was the most condensed silica species ($T_3$, −68 ppm), which is present in around a 3:2 ratio with the $T_2$ peak (−58 ppm). These data demostrated that the silica sample was highly condensed.

The mechanism of silica condensation is not well understood. Prior art literature opinion favors a mechanism catalyzed solely by hydroxide ions. In the proposed mechanism, a hydroxide ion extracts a proton from a silanol group, and the O$^-$ formed, attacks a fully protonated silica center in an $S_N^2$ reaction.

If this mechanism were correct, then one would expect that all amines would behave similarly, because they are not directly involved in catalytic mechanism (only hydroxide ions that are formed when they are placed in water). However, while ammonia, trimethyl amine, and triethylamine behave similarly, methylamine behaves quite differently. Methylamine, at the same concentration as the other amines, instead of forming water droplets which are all a similar size (as with the other cross-linkers used), forms some very large drops, as well as many much finer drops, within the large silica droplets. After the cross-linking process appears to be complete, the large particles then appear to swell. Also, the smaller emulsion droplets present initially appear to be cross-linked but then seem to be eaten away.

This major difference suggests that the lone pair of electrons on the amine nitrogen plays an important role in the catalytic mechanism. We have also observed that silica films formed from a surfactant templating approach were easily destroyed, but exposure of the films to ammonia vapor cross-linked the silica to form stable films. As ammonia vapor was used, there were no hydroxide ions present, yet clearly the cross-linking process had occurred.

The formation of water in the particles resulted in large pores being formed within the particles. Also found in the particles were very fine channels, which link the large pores resulting in particles. The porosity was confirmed using BET $N_2$ adsorption which estimated the surface area of the particles to be in excess of 70 $m^2$ per gram. To make the particles highly optically diverse, thiol reactive fluorescent dyes have been incorporated into the particles, confirming their potential as optically diverse supports for combinatorial chemistry.

Other Embodiments

All publications, patents, and patent applications mentioned in the above specification are hereby incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

wherein said porous organosilica spherical particles are formed by the process of:
  a) forming a mixture of acid, water, and a silane or silane derivative monomer, wherein said silane or silane derivative monomer is selected from the group consisting of an X-Y trimethoxy- or triethoxysilane, wherein X is a moiety selected from the group consisting of a thiol, a chlorine, or an isothiocyanate, and Y is a carbon chain selected from the group consisting of ethyl, propyl, butyl, pentyl, hexyl, and heptyl;
  b) during or after said forming of said mixture, exposing said mixture to a non-surfactant catalyst for cross-linking, wherein said cross-linking occurs to form said organosilica spherical particles in the absence of added surfactant.

2. The reagent of claim 1, wherein at least 95% of said spherical particles have a mean diameter between 5.0 microns and 50 microns.

3. The reagent of claim 1, wherein at least 95% of said spherical particles have a mean diameter between 0.08 microns and 5 microns.

4. the reagent of claim 1, wherein at least 95% of said spherical particles have a mean diameter between 10 microns and 200 microns.

The Invention claimed is:

1. A reagent for solid phase synthesis consisting essentially of porous organosilica spherical particles having:
  i) interior and exterior surfaces;
  ii) diameters between approximately 0.08 microns and 200 microns;
  iii) a mean exterior, interior, or total surface area of at least approximately 5 square meters per gram of dry weight;
  iv) a high level of reactive functionalized groups on the particle exterior surfaces;
  wherein the pores of said particles non-uniform in diameter and are linked by channels, and wherein the interior surfaces are capable of binding molecules, 5. the reagent of claim 1, wherein said spherical particles further comprise at least 4 different fluorescent dyes in at least 4 different concentrations and wherein each dye is attached to said spherical particles in a form that resists leaching of the dye.

6. The reagent of claim 5, wherein the fluorescent dyes are attached to said interior surfaces of said spherical particles by covalent coupling.

7. The reagent of claim 1, wherein said spherical particles comprise pores between approximately 0.1 and 5 microns in mean diameter, wherein at least two of the pores are linked by channels less than approximately 75 nanometers in mean diameter.

8. The reagent of claim 1, wherein said spherical particles comprise at least 50% by weight silane derivative.

9. The reagent of claim 1, wherein said silane derivative is mercapto functionalized.

10. The reagent of claim 9, wherein said spherical particles comprise at least 75% mercapto-functionalized silane derivative.

11. The reagent of claim 9, wherein the silane derivative is 3-mercaptopropyl trimethoxysilane.

12. The reagent of claim 8, wherein said spherical particles comprise at least 90% by weight silane derivative.

13. The reagent of claim 8, wherein said spherical particles comprise 100% by weight silane derivative.

14. The reagent of claim 1, wherein at least 95% of said spherical particles have at least $3 \times 10^{19}$ binding moieties per gram of dry weight.

15. The reagent of claim 1, wherein at least 95% of said spherical particles have at least $1 \times 10^{20}$ binding moieties per gram of dry weight.

16. A composition comprising the reagent of claim 1, and further comprising colloidal silica particles having diameters between approximately 0.1 and 2 microns, wherein the spherical particles of claim 1 have diameters between approximately 2 and 100 microns.

17. The reagent of claim 16, further comprising an optical tag selected from the group consisting of a fluorophore, a phosphor, a lanthanide chelate, a chromophore, a chemilumiphore, an organosilica particle, a nanocrystal particle, a colloidal particle having an average diameter between approximately 2 nanometer and 100 nanometers, a colloidal particle having an average diameter between approximately 2 nanometer and 100 nanometers labeled with a fluorophore, a colloidal gold particle, a colloidal gold/silver composite, and a colloidal selenium particle.

18. The reagent of claim 1, wherein said spherical particles further comprise a moiety capable of attaching an optical tag.

19. The reagent of claim 18, wherein the moiety capable of attaching an optical tag is selected from the group consisting of amino groups, carboxyl groups, thiol group antibody fragments, polycationic polymers, polyanionic polymers, avidin, biotin and polynucleic acid.

20. The reagent of claim 1, wherein said spherical particles further comprise an optical tag selected from the group consisting of a fluorophore, a phosphor, a lanthanide chelate, a chromophore, a chemilumiphore, and organosilica particle, a nanocrystal particle, a colloidal particle having an average diameter between approximately 2 nanometer and 100 nanometers, a colloidal particle having an average diameter between approximately 2 nanometer and 100 nanometers labeled with a fluorophore, a colloidal gold particle, a colloidal gold/silver composite, and a colloidal selenium particle.

21. The reagent of claim 1, wherein said porous organosilica spherical particles further comprise fluorescent tags covalently attached to the interior surfaces, wherein the fluorescent tags are attached during synthesis of the particles or after particle synthesis by allowing functionalized fluorescent tags to enter the pores after pore formation.

22. The reagent of claim 1, wherein said porous organosilica spherical particles are capable of being optically detected without local focusing.

* * * * *

SEQUENCE LISTING

```
<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Synthetic

<400> SEQUENCE: 1
tacaggcctc acgttacctg                                                 20

<210> SEQ ID NO 2
<211> LENGTH: 20
<212> TYPE: DNA
<213> ORGANISM: Artificial Sequence
<220> FEATURE:
<223> OTHER INFORMATION: Synthetic

<400> SEQUENCE: 2
caggtaacgt gaggcctgtt                                                 20
```